United States Patent
Lee et al.

(10) Patent No.: US 10,347,221 B2
(45) Date of Patent: Jul. 9, 2019

(54) ELECTRONIC DEVICE AND METHOD FOR CONTROLLING DISPLAY THEREOF

(71) Applicant: Samsung Electronics Co., Ltd., Gyeonggi-do (KR)

(72) Inventors: Sooyong Lee, Seoul (KR); Jaeseong Yoon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 72 days.

(21) Appl. No.: 15/342,762

(22) Filed: Nov. 3, 2016

(65) Prior Publication Data
US 2017/0124990 A1    May 4, 2017

(30) Foreign Application Priority Data
Nov. 3, 2015   (KR) .......................... 10-2015-0153689

(51) Int. Cl.
| G09G 5/00 | (2006.01) |
| G09G 5/397 | (2006.01) |
| G06F 3/14 | (2006.01) |
| G06F 3/147 | (2006.01) |
| G09G 5/14 | (2006.01) |
| G09G 3/20 | (2006.01) |

(52) U.S. Cl.
CPC ............. *G09G 5/397* (2013.01); *G06F 3/147* (2013.01); *G06F 3/1438* (2013.01); *G09G 3/20* (2013.01); *G09G 5/006* (2013.01); *G09G 5/14* (2013.01)

(58) Field of Classification Search
CPC ......... G06F 3/1438; G06F 3/147; G09G 3/20; G09G 5/006; G09G 5/14; G09G 5/397
USPC .................................................. 345/1.1, 619
See application file for complete search history.

(56) References Cited

U.S. PATENT DOCUMENTS

| 9,406,281 | B2 | 8/2016 | Lee |
| 2005/0237699 | A1 | 10/2005 | Carroll |
| 2007/0258010 | A1 | 11/2007 | Hong et al. |
| 2011/0029907 | A1* | 2/2011 | Bakhash ............. G06F 3/04815 715/769 |
| 2012/0075334 | A1* | 3/2012 | Pourbigharaz ........ G06F 3/1438 345/619 |
| 2012/0162158 | A1 | 6/2012 | Choi et al. |
| 2014/0002327 | A1* | 1/2014 | Toren .................... G06F 3/1423 345/1.1 |
| 2014/0152682 | A1 | 6/2014 | Yoon |
| 2014/0184628 | A1 | 7/2014 | Lee |
| 2015/0309764 | A1 | 10/2015 | Yamakita |

FOREIGN PATENT DOCUMENTS

KR   1020140085048   7/2014

OTHER PUBLICATIONS

European Search Report dated Jun. 16, 2017 issued in counterpart application No. 16197137.9-1914, 9 pages.
International Search Report dated Feb. 8, 2017 issued in counterpart application No. PCT/KR2016/012578, 3 pages.

\* cited by examiner

*Primary Examiner* — Insa Sadio
(74) *Attorney, Agent, or Firm* — The Farrell Law Firm, P.C.

(57) ABSTRACT

An electronic device is provided which includes a plurality of displays, a processor electrically connected to the plurality of displays, and a memory electrically connected to the processor, in which the memory stores a middleware, which when executed by a processor divides image data to be displayed on the plurality of displays, and transmits the divided image data to display drivers of the plurality of displays.

22 Claims, 30 Drawing Sheets

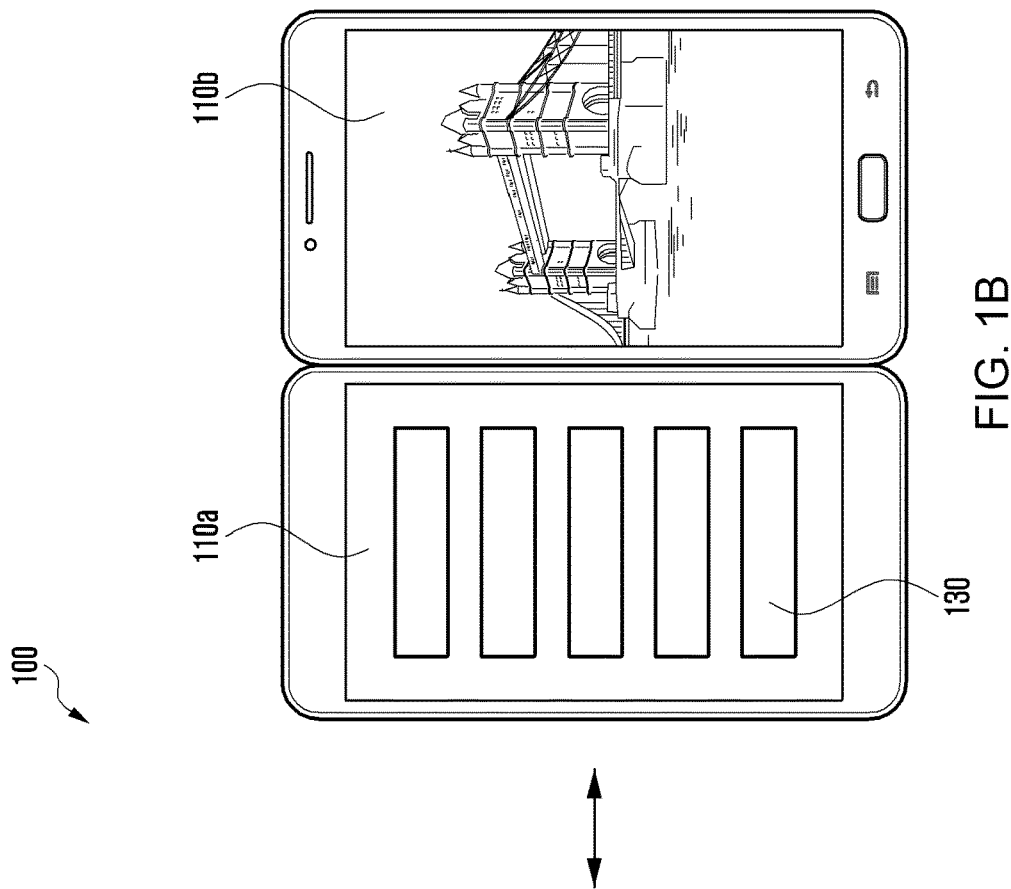
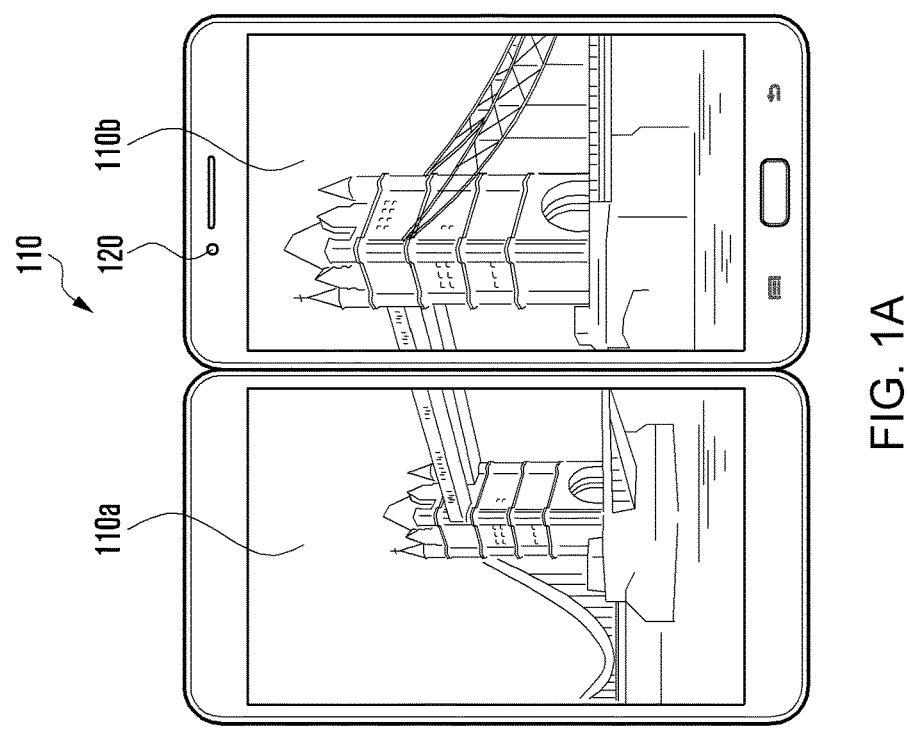
FIG. 1B
FIG. 1A

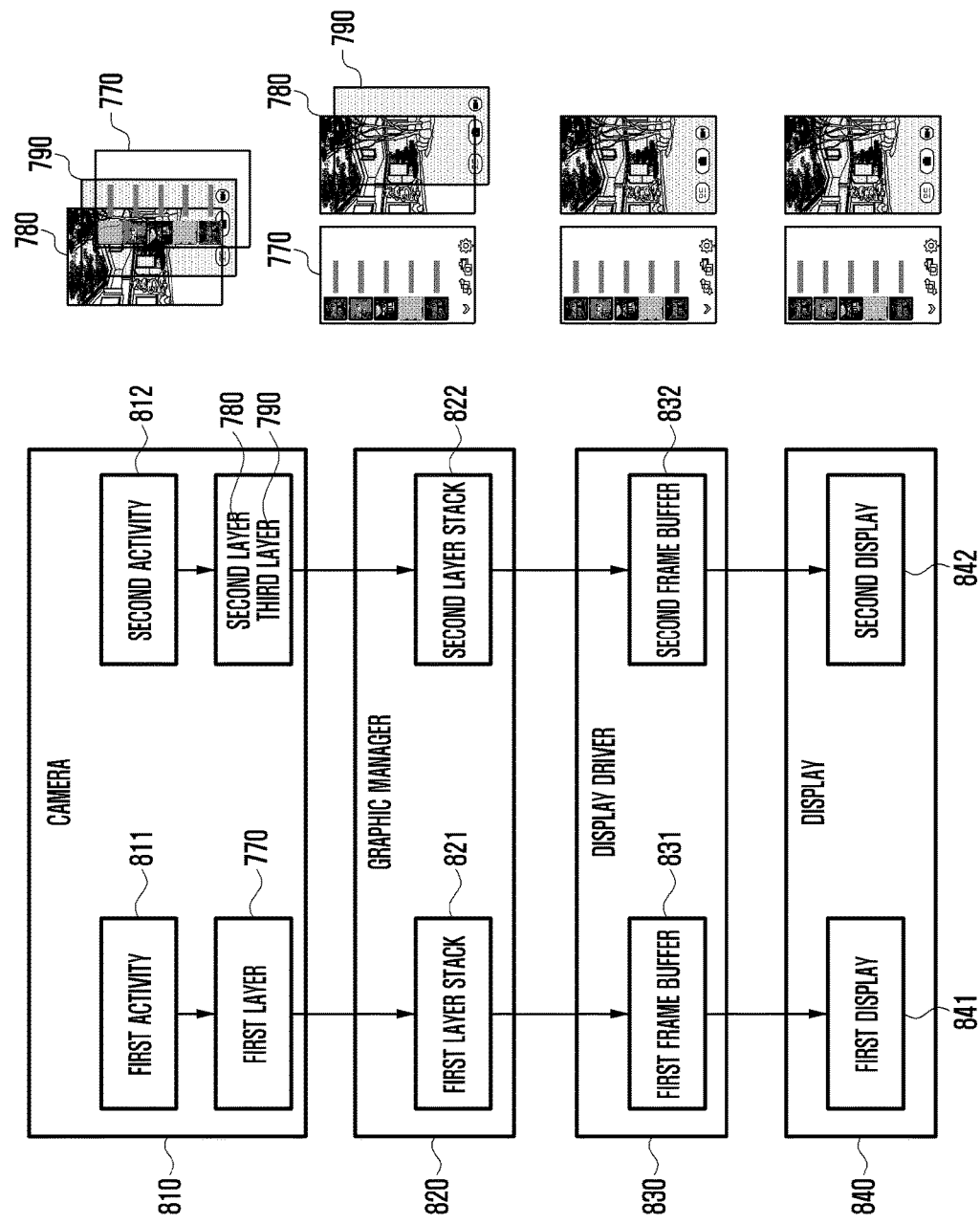

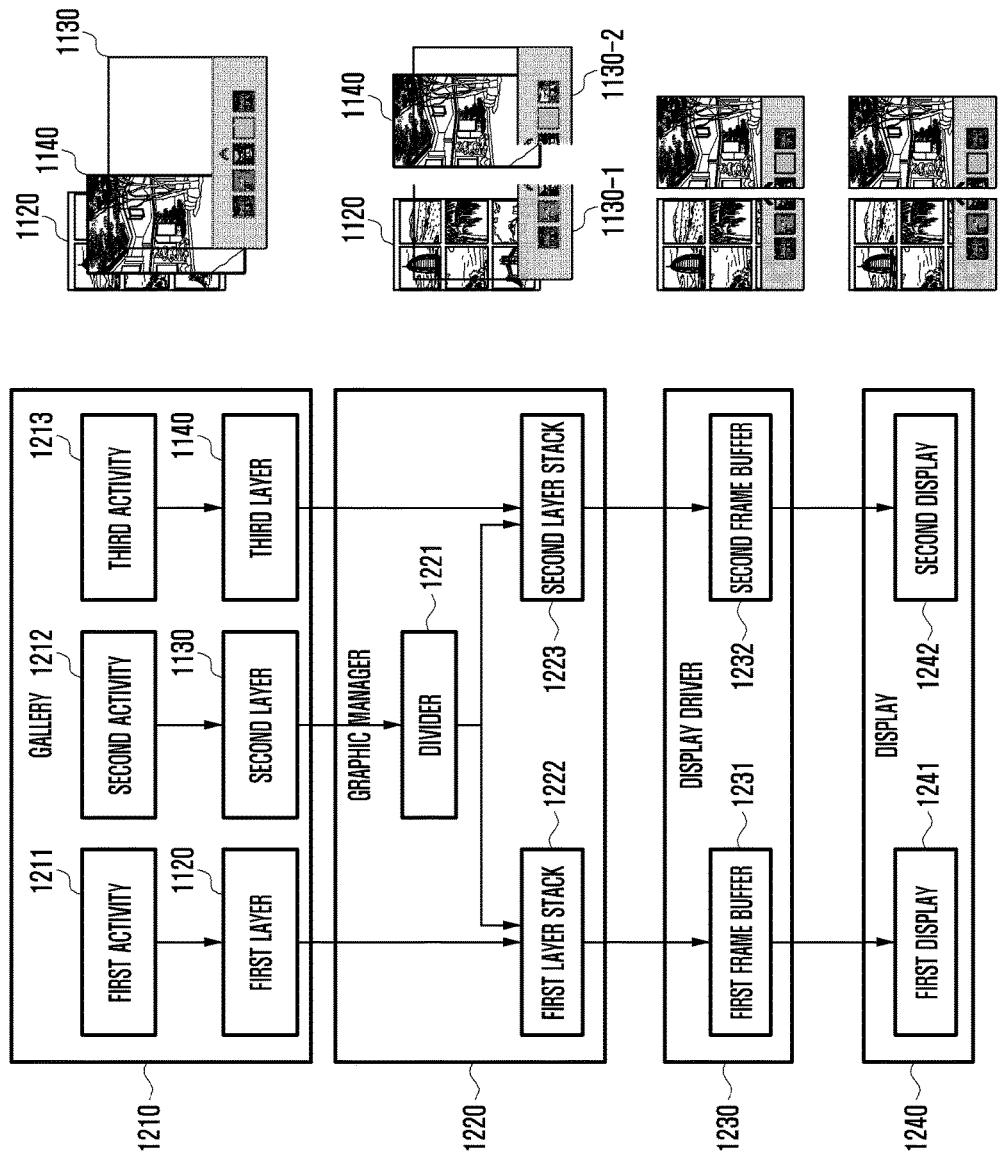

ELECTRONIC DEVICE AND METHOD FOR CONTROLLING DISPLAY THEREOF

PRIORITY

This application claims priority under 35 U.S.C. § 119(a) to Korean Patent Application Serial No. 10-2015-0153689, which was filed on Nov. 3, 2015, in the Korean Intellectual Property Office, the entire disclosure of which is incorporated herein by reference.

BACKGROUND

1. Field of the Disclosure

The present disclosure generally relates to an electronic device having a plurality of displays and a method for controlling a display.

2. Description of the Related Art

In recent years, various types of display devices have been used. The display device may include at least two displays and a size of a screen of the display tends to be gradually increased. Therefore, a user may view the screen while selectively using the plurality of displays.

The electronic device may output one content using the plurality of displays or display different content on the plurality of displays.

Conventionally, when the electronic device displays content on the plurality of displays, a display driver processes the contents so that the content fits each display size and displays the processed content. However, there is a problem in that when specifications of the display are different, drivers fitting each display need to be provided. Further, when a system of the electronic device is updated, the display driver also needs to be updated.

Further, even if only one of the plurality of displays is activated, the contents are still provided as much capacity as the plurality of displays, and thus resources (such as memory and power) are wasted.

SUMMARY

Accordingly, aspects of the present disclosure are directed to a method for generating and displaying content using an application and a middleware based on a plurality of displays to save resources.

In accordance with an aspect of the present disclosure, an electronic device is provided, which includes a plurality of displays, a processor electrically connected to the plurality of displays, and a memory electrically connected to the processor, in which upon execution, the memory may store a middleware to allow the processor to divide content data to be displayed on the plurality of displays, respectively, and transmit the divided content data to display drivers of the plurality of displays, respectively.

In accordance with another aspect of the present disclosure, a method is provided for controlling a display of an electronic device, including dividing, by a middleware stored in the electronic device, content data to be displayed on a plurality of displays, respectively, transmitting, by the middleware stored in the electronic device, the content data to display drivers of the plurality of displays, respectively, and transmitting, by the display driver, the content data to the at least one display and displaying a content.

In accordance with another aspect of the present disclosure, a non-transitory recording medium is provided in which a middleware for executing a method for controlling a display of an electronic device is stored, wherein upon execution, the middleware allows the processor of the electronic device to divide content data to be displayed on the plurality of displays, respectively, transmit the divided content data to display drivers of the plurality of displays, respectively, and allows the display driver to transmit the content data to the at least one display to display a content.

BRIEF DESCRIPTION OF THE DRAWINGS

These and other aspects, advantages and features of the present disclosure will become apparent to those skilled in the art from the following detailed description, when taken in conjunction with the accompanying drawings in which:

FIGS. 1A and 1B illustrate an operation of an electronic device, according to an embodiment of the present disclosure;

FIG. 8 is a flow chart of an operation of an electronic device displaying different images on a display, according to an embodiment of the present disclosure;

FIG. 12 is a flow chart of an operation of an electronic device simultaneously displaying different images on each of the displays while dividing one image and displaying the divided images on the plurality of displays, according to an embodiment of the present disclosure;

DETAILED DESCRIPTION

Figure 2:
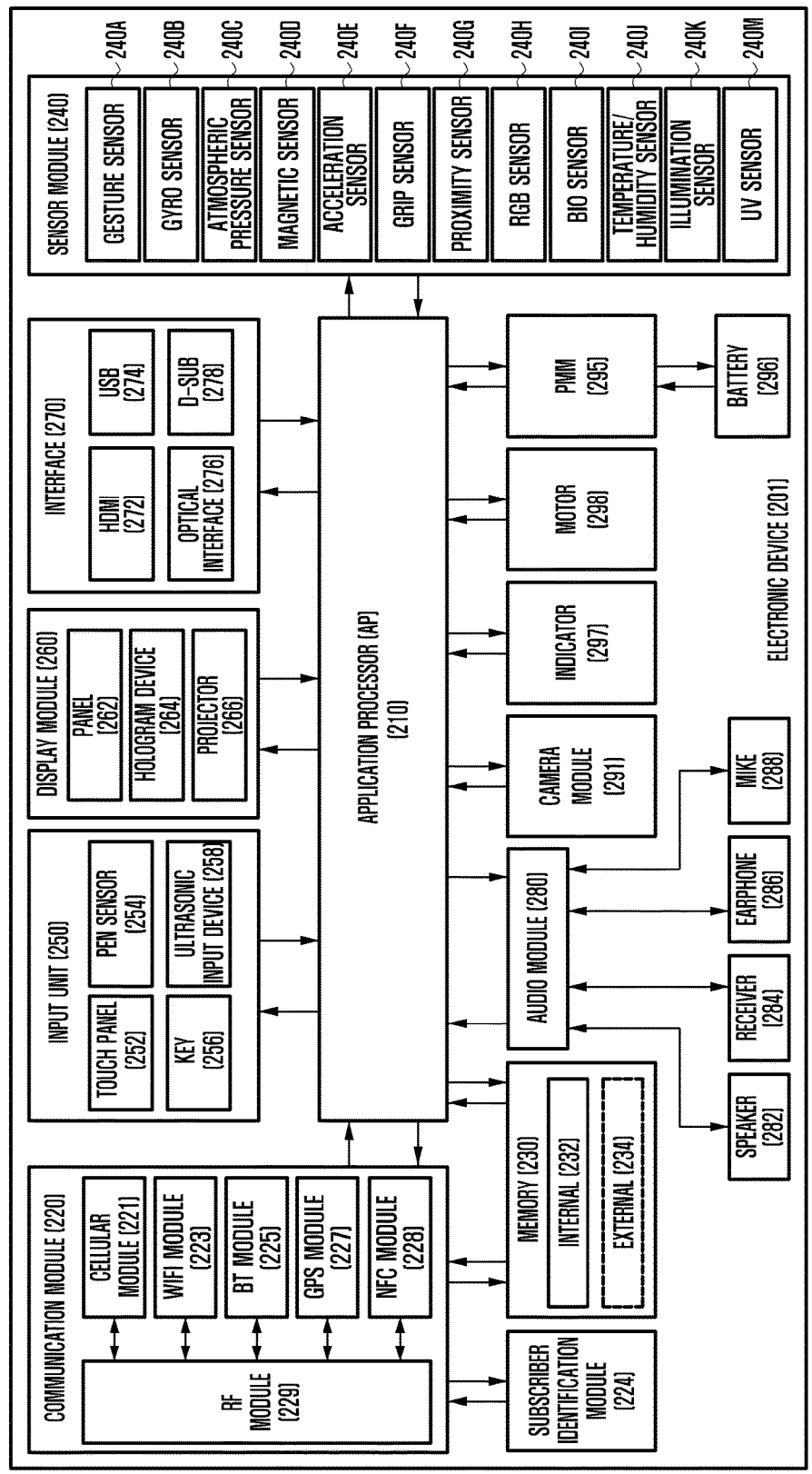
FIG. 2 is a block diagram of an electronic device, according to an embodiment of the present disclosure.

Hereinafter, various embodiments of the present disclosure will be described with reference to the accompanying drawings. However, it should be understood that there is no limiting the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expressions "have", "may have", "include", or "may include" refer to the existence of a corresponding feature (e.g., numeral, function, operation, or constituent element such as component), and do not exclude one or more additional features.

In the present disclosure, the expressions "A or B", "at least one of A or/and B", or "one or more of A or/and B" may include all possible combinations of the items listed. For example, the expressions "A or B", "at least one of A and B", or "at least one of A or B" refers to all of (1) including at least one A, (2) including at least one B, or (3) including all of at least one A and at least one B.

The expressions "a first", "a second", "the first", or "the second" as used in an embodiment of the present disclosure may modify various components regardless of the order and/or the importance but do not limit the corresponding components. For example, a first user device and a second user device indicate different user devices although both of them are user devices. For example, a first element may be referred to as a second element, and similarly, a second element may be referred to as a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled" to another element (second element), there are no elements (e.g., third element) interposed between them.

The expression "configured to" as used in the present disclosure may be used interchangeably with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a general-purpose processor (e.g., central processing unit (CPU) or application processor (AP)) that may perform the corresponding operations by executing one or more software programs stored in a memory device.

The terms used in the present disclosure are only used to describe specific embodiments, and do not limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the same meanings as the contextual meanings in the relevant field of art, and are not to be interpreted to have ideal or excessively formal meanings unless clearly defined in the present disclosure. In some cases, even the terms defined in the present disclosure should not be interpreted to exclude embodiments of the present disclosure.

FIGS. 1A and 1B illustrate an operation of an electronic device 100 according to an embodiment of the present disclosure.

Referring to FIGS. 1A and 1B, the electronic device 100 may be implemented as devices for various purposes that include displays 110a and 110b. For example, the electronic device 100 may be implemented as a cellular phone, a smart phone, a laptop computer, a tablet device, an e-book device, a digital broadcasting device, personal digital assistants (PDA), a portable multimedia player (PMP), navigation, or wearable devices such as a smart watch, smart glasses, and a head-mounted display (HMD), but is not limited thereto.

According to an embodiment of the present disclosure, the electronic device 100 may differently implement content displayed on a screen, such as images and moving pictures that are displayed on a display 110 depending on a state change of an application that is being executed in the electronic device 100.

The application is a program that is embedded in the electronic device 100 or downloaded from outside of the electronic device 100 to be executed in the electronic device and may perform various functions of the electronic device 100. An example of the state change of the application may include execution of application, a change in operation in the application that is being executed, a state change of a plurality of displays that execute the application, and the like.

Referring to FIG. 1A, the electronic device 100 includes a camera 120. According to an embodiment of the present disclosure, the electronic device 100 may capture an image using the camera 120 and display the captured image on the display 110. The electronic device 100 may display a content received from an external electronic device through a communication module on the display 110. FIG. 1A is a diagram illustrating a state in which a screen currently input through the camera 120 or a screen received from an external electronic device is displayed on a plurality of displays. One image is divided and displayed on two displays 110a and 110b.

The electronic device 100 may change a configuration of a screen as illustrated in FIG. 1B in response to an input from a user. Referring to FIG. 1B, icons 130 that may change a photographing condition are displayed on the first display 110a. The image input through the camera 120 is displayed on the second display 110b. That is, the images displayed on the plurality of displays 110 are changed depending on the state change in a camera application that is currently being executed.

As such, the electronic device 100 may use the plurality of displays 110 depending on the state change in the application to provide a screen configuration useful to a user.

FIG. 2 illustrates a block diagram of an electronic device according to an embodiment of the present disclosure.

The electronic device 100 includes one or more APs 210, a communication module 220, a subscriber identification module (SIM) card 224, a memory 230, a sensor module 240, an input device 250, a display 260, an interface 270, an audio module 280, a camera module 291, a power managing module 295, a battery 296, an indicator 297, and a motor 298.

The AP 210 operates an OS or an application program so as to control a plurality of hardware or software component elements connected to the AP 210 and execute various data processing and calculations including multimedia data. The AP 210 may be implemented by, for example, a system on chip (SoC). The processor 210 may further include a graphics processing unit (GPU) and/or image signal processor. The AP 210 may include at least one portion of components illustrated in FIG. 2 (such as a cellular module 221). The AP 210 may load command or data received from at least one of another component (such as a non-volatile memory), store various data in the non-volatile memory.

The communication module 220, for example, includes the cellular module 221, a Wi-Fi module 223, a BT module 225, a GPS module 227, a NFC module 228, and a radio frequency (RF) module 229.

The cellular module 221 provides a voice, a call, a video call, a short message service (SMS), or an internet service through a communication network such as long term evolution (LTE), fifth generation (5G), long term evolution advanced (LTE-A), code division multiple access (CDMA), wideband code division multiple access (WCDMA), universal mobile telecommunications system (UMTS), wireless broadband (WiBro), and global system for mobile communication (GSM), etc. Further, the cellular module 221 may distinguish and authenticate electronic devices within a communication network by using a SIM card 224. The cellular module 221 performs at least some of the functions which may be provided by the AP 210. For example, the cellular module 221 may perform at least some of the multimedia control functions. The cellular module 221 may include a CP.

Although the cellular module 221, the Wi-Fi module 223, the BT module 225, the GPS module 227, and the NFC module 228 are at least some (e.g., two or more) of the cellular module 221, the Wi-Fi module 223, the BT module 225, the GPS module 227, and the NFC module 228 may be included in one integrated chip (IC) or one IC package. The RF module 229 transmits/receives data, for example, an RF signal. The RF module 229 may include, for example, a transceiver, a power amp module (PAM), a frequency filter, a low noise amplifier (LNA) and the like. Although the cellular module 221, the Wi-Fi module 223, the BT module 225, the GPS module 227, and the NFC module 228 share one RF module 229 in FIG. 2, at least one of the cellular module 221, the Wi-Fi module 223, the BT module 225, the GPS module 227, and the NFC module 228 may transmit/receive an RF signal through a separate RF module. The SIM card 224 is a card including a SIM and may be inserted into a slot formed in a particular portion of the electronic device. The SIM card 224 includes unique identification information (e.g., integrated circuit card identifier (ICCID)) or subscriber information (e.g., international mobile subscriber identity (IMSI)).

The memory 230 (e.g., memory 130) includes an internal memory 232 or an external memory 234. The internal memory 232 may include, for example, at least one of a volatile memory (e.g., a random access memory (RAM), a dynamic RAM (DRAM), a static RAM (SRAM), a synchronous dynamic RAM (SDRAM), and the like), and a non-volatile memory (e.g., a read only memory (ROM), a one time programmable ROM (OTPROM), a programmable ROM (PROM), an erasable and programmable ROM (EPROM), an electrically erasable and programmable ROM (EEPROM), a mask ROM, a flash ROM, a not and (NAND) flash memory, a not or (NOR) flash memory, and the like). The external memory 234 may be functionally connected to the electronic device 100 through various interfaces.

The sensor module 240 measures a physical quantity or detects an operation state of the electronic device 201, and converts the measured or detected information to an electronic signal. The sensor module 240 includes, for example, at least one of a gesture sensor 240A, a gyro sensor 240B, an atmospheric pressure (barometric) sensor 240C, a magnetic sensor 240D, an acceleration sensor 240E, a grip sensor 240F, a proximity sensor 240G, a color sensor 240H (e.g., red, green, and blue (RGB) sensor) 240H, a biometric sensor 240I, a temperature/humidity sensor 240J, an illumination (light) sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, a fingerprint sensor (not illustrated), and the like. The sensor module 240 may further include a control circuit for controlling one or more sensors included in the sensor module 240.

The input device 250 includes a touch panel 252, a (digital) pen sensor 254, a key 256, and an ultrasonic input device 258. For example, the touch panel 252 may recognize a touch input in at least one type of a capacitive type, a resistive type, an infrared type, and an acoustic wave type. The touch panel 252 may further include a control circuit. In the capacitive type, the touch panel 252 may recognize proximity as well as a direct touch. The touch panel 252 may further include a tactile layer. In this event, the touch panel 252 provides a tactile reaction to the user.

The (digital) pen sensor 254 may be implemented, for example, using a method identical or similar to a method of receiving a touch input of the user, or using a separate recognition sheet. The key 256 may include, for example, a physical button, an optical key, or a key pad. The ultrasonic input device 258 is a device which may detect an acoustic wave by a microphone 288 of the electronic device 201 through an input means generating an ultrasonic signal to identify data and may perform wireless recognition.

The display 260 (e.g., display 160) includes a panel 262, a hologram device 264, and a projector 266. The panel 262 may be, for example, a LCD or an active matrix OLED (AM-OLED). The panel 262 may be implemented to be, for example, flexible, transparent, or wearable. The panel 262 may be configured by the touch panel 252 and one module. The hologram device 264 shows a stereoscopic image in the air by using interference of light. The projector 266 projects light on a screen to display an image. For example, the screen may be located inside or outside the electronic device 100.

The interface 270 includes, for example, an HDMI 272, a USB 274, an optical interface 276, and a D-subminiature (D-sub) 278. Additionally or alternatively, the interface 270 may include, for example, a mobile high-definition link (MHL) interface, an SD card/multi-media card (MMC), or an infrared data association (IrDA) standard interface.

The electronic device 100 according to the embodiment of the present disclosure may include a plurality of displays 260. Allowing the electronic device 100 to change images displayed on the plurality of displays 260 or display an image on only one display 260 will be described below.

The audio module 280 bi-directionally converts a sound and an electronic signal. The audio module 280 processes sound information input or output through, for example, a speaker 282, a receiver 284, an earphone 286, the microphone 288 and the like.

The camera module 291 is a device which may photograph a still image and a video. According to an embodiment of the present disclosure, the camera module 291 may include one or more image sensors (e.g., a front sensor or a back sensor), an image signal processor (ISP) or a flash (e.g., an LED or xenon lamp).

The power managing module 295 manages power of the electronic device 201. The power managing module 295 may include, for example, a power management integrated circuit (PMIC), a charger IC, or a battery gauge.

The PMIC includes a charger IC for at least one of the wired charging method and the wireless charging method. The wireless charging method may include, for example, a magnetic resonance method, a magnetic induction method and an electromagnetic wave method, and additional circuits for wireless charging, for example, circuits such as a coil loop, a resonant circuit, a rectifier and the like may be added.

The battery gauge measures, for example, a remaining charge quantity of the battery 296, or a voltage, a current, or a temperature during charging. The battery 296 may include a rechargeable battery or a solar battery.

The indicator 297 shows particular statuses of the electronic device 201 or a part (e.g., AP 210) of the electronic device 201, for example, a booting status, a message status, a charging status and the like. The motor 298 converts an electrical signal to a mechanical vibration. The electronic device 100 may include a processing unit (e.g., GPU) for supporting a module TV. The processing unit for supporting the mobile TV may process, for example, media data according to a standard of digital multimedia broadcasting (DMB), digital video broadcasting (DVB), Mediaflo and the like.

Each of the components of the electronic device according to an embodiment of the present disclosure may be implemented by one or more components and the name of the corresponding component may vary depending on a type of the electronic device. The electronic device may include at least one of the above described components, a few of the components may be omitted, or additional components may be further included. Also, some of the components of the electronic device may be combined to form a single entity, and thus may equivalently execute functions of the corresponding components before being combined.

Figure 3:
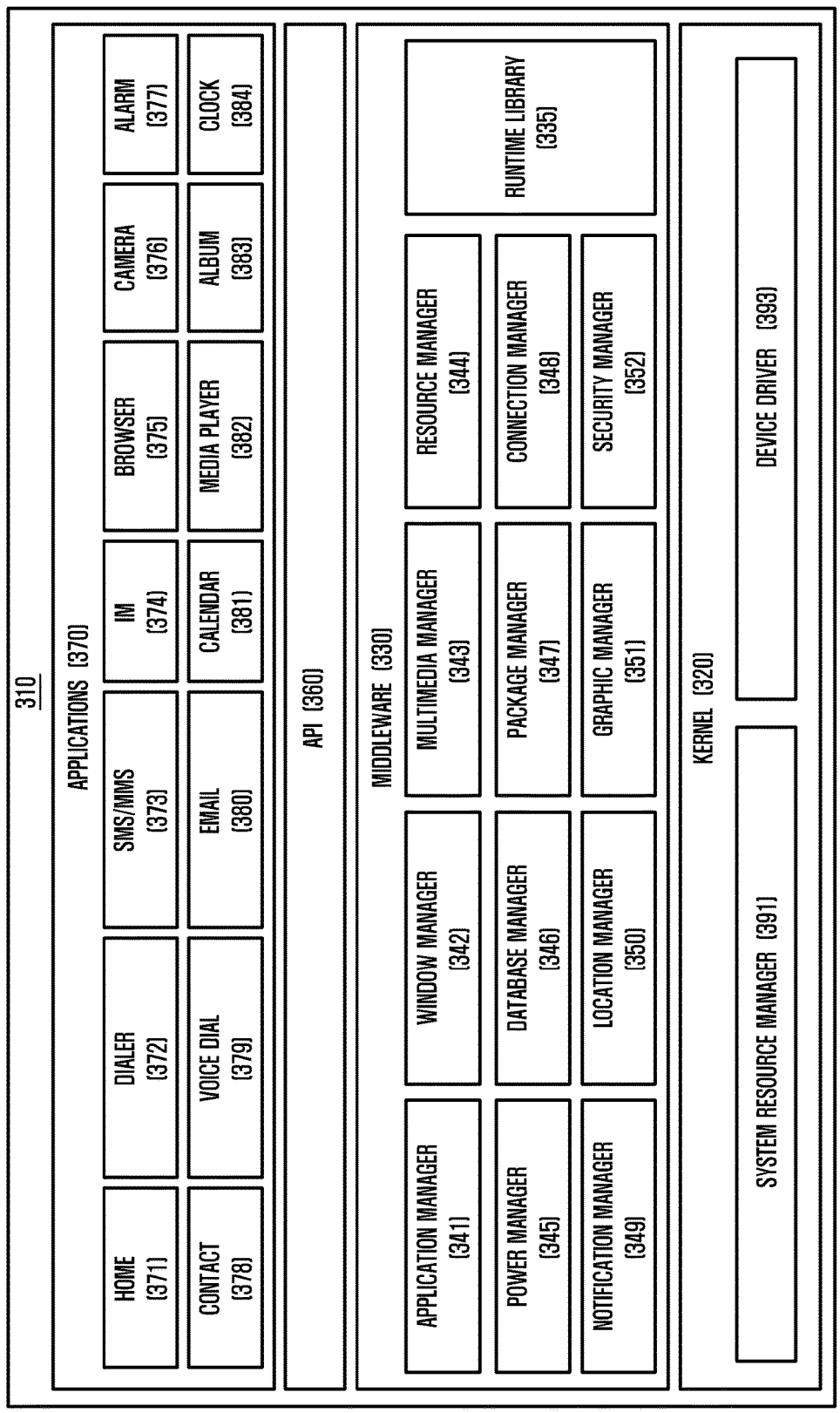
FIG. 3 is a block diagram of a programming module, according to an embodiment of the present disclosure.

FIG. 3 is a block diagram illustrating a programming module according to an embodiment of the present disclosure.

The programming module 310 may include an OS that is implemented in hardware to control resources related to an electronic device 100, and/or various applications 370, driven by the OS. For example, the OS may be Android, iOS, Windows, Symbian, Tizen, Bada, and the like.

Referring to FIG. 3, the programming module 310 includes a kernel 320, middleware 330, an API 360, and the applications 370. At least part of the program module 310 may be preloaded on the electronic device or downloaded from a server.

The kernel 320, includes a system resource manager 391 and/or a device driver 393. The system resource manager 391 may include, for example, a process manager, a memory manager, and a file system manager. The system resource manager 391 may control, allocate, and/or collect system resources. The device driver 393 may include, for example, a display driver, a camera driver, a BT driver, a shared memory driver, a USB driver, a keypad driver, a Wi-Fi driver, and an audio driver. Further, the device driver 393 may include an inter-process communication (IPC) driver.

The middleware 330 may include a plurality of modules implemented in advance for providing functions commonly used by the applications 370. Further, the middleware 330 may provide the functions through the API 360 such that the applications 370 may efficiently use restricted system resources within the electronic apparatus. For example, as shown in FIG. 3, the middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while one of the applications 370 is being executed. According to an embodiment of the present disclosure, the runtime library 335 may perform an input/output, memory management, and/or a function for an arithmetic function.

The application manager 341 may manage a life cycle of at least one of the applications 370. The window manager 342 may manage graphical user interface (GUI) resources used by a screen. The multimedia manager 343 may detect formats used for reproduction of various media files, and may perform encoding and/or decoding of a media file by using a codec suitable for the corresponding format. The resource manager 344 may manage resources such as a source code, a memory, and a storage space of at least one of the applications 370.

The power manager 345 may manage a battery and/or power, while operating together with a basic input/output system (BIOS), and may provide power information used for operation. The database manager 346 may manage generation, search, and/or change of a database to be used by at least one of the applications 370. The package manager 347 may manage installation and/or an update of an application distributed in a form of a package file.

For example, the connectivity manager 348 may manage wireless connectivity such as Wi-Fi or BT. The notification manager 349 may display and/or notify of an event, such as an arrival message, a proximity notification, and the like, in such a way that does not disturb a user. The location manager 350 may manage location information of an electronic apparatus. The graphic manager 351 may manage a graphic effect which will be provided to a user, and/or a user interface related to the graphic effect. The security manager 352 may provide all security functions used for system security and/or user authentication. The middleware 330 may further include a telephony manager for managing a voice and/or video communication function of the electronic apparatus. The middleware 330 may provide modules specialized according to types of OSs in order to provide differentiated functions. Further, the middleware 330 may dynamically remove some of the existing elements and/or add new elements.

The API 360, which may be similar to the API 133, is a set of API programming functions, and may be provided with a different configuration according to the OS. For example, in a case of Android or iOS, one API set may be provided for each of platforms, and in a case of Tizen, two or more API sets may be provided.

The applications 370 includes one or more of the following: a home application 371 a dialer application 372, an SMS/multimedia messaging service (MMS) application 373, an instant messaging (IM) application 374, a browser application 375, a camera application 376, an alarm application 377, a contact application 378, a voice dial application 379, an email application 380, a calendar application 381, a media player application 382, an album application 383, a clock application 384, a payment application 385, a health care application (e.g., the measurement of blood pressure, exercise intensity, etc.), an application for providing environment information (e.g., atmospheric pressure, humidity, temperature, etc.). However, the present disclosure is not limited thereto, and the applications 370 may include any other similar and/or suitable application.

According to an embodiment of the present disclosure, the applications 370 are capable of including an application for supporting information exchange between an electronic device and an external device. The information exchange application is capable of including a notification relay application for relaying specific information to external devices or a device management application for managing external devices.

For example, the notification relay application is capable of including a function for relaying notification information, created in other applications of the electronic device (e.g., SMS/MMS application, email application, health care application, environment information application, etc.) to external devices. The device management application is capable of managing (e.g., installing, removing or updating) at least one function of an external device communicating with the electronic device. Examples of the function are turning-on/off the external device or part of the external device, controlling the brightness (or resolution) of the display, applications running on the external device, services provided by the external device, etc. Examples of the services are a call service, messaging service, etc.

According to an embodiment of the present disclosure, the applications 370 are capable of including an application (e.g., a health care application of a mobile medical device, etc.) specific to the attributes of an external device. The applications 370 are capable of including applications received from an external device. The applications 370 are capable of including a preloaded application or third party applications that may be downloaded from a server. It should be understood that the components of the program module 310 may be called different names according to the types of operating systems.

According to an embodiment of the present disclosure, at least part of the program module 310 may be implemented with software, firmware, hardware, or any combination of two or more of them. At least part of the program module 310 may be implemented (e.g., executed) by a processor (e.g., processor 210). At least part of the programing module 310 may include modules, programs, routines, sets of instructions or processes, etc., in order to perform one or more functions.

Figure 4:
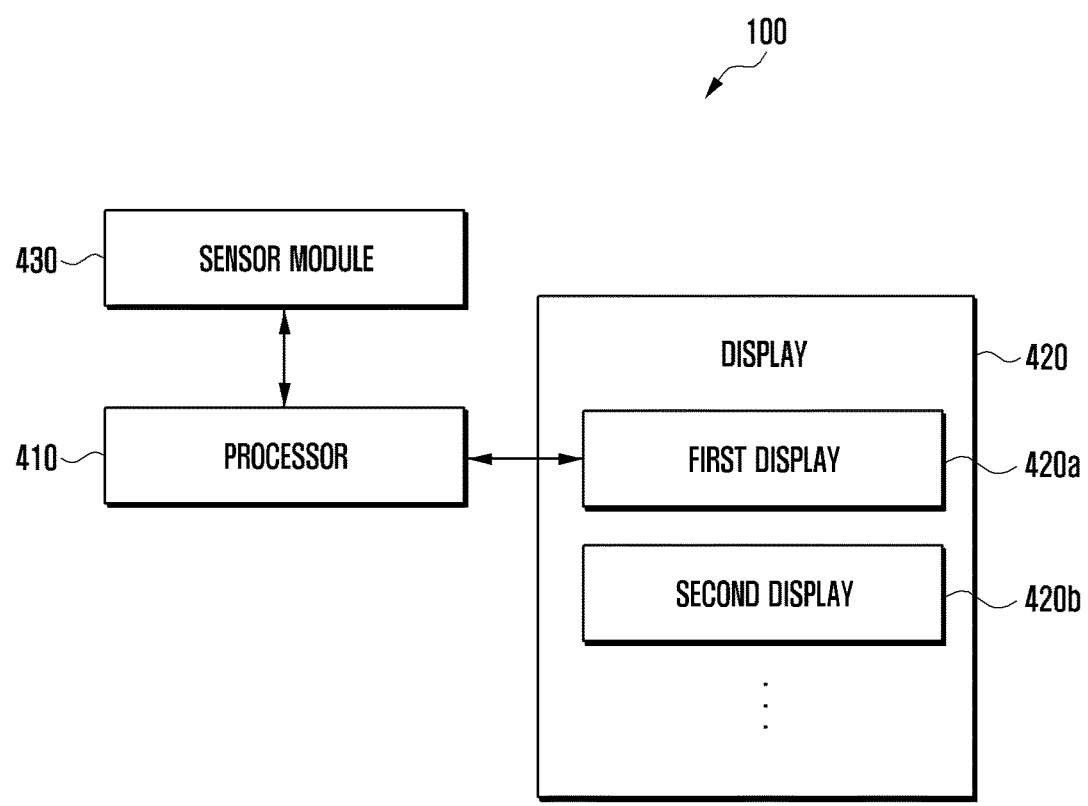
FIG. 4 is a block diagram of an electronic device, according to an embodiment of the present disclosure.

FIG. 4 is a block diagram schematically illustrating a configuration of the electronic device 100 according to an embodiment of the present disclosure.

Referring to FIG. 4, the electronic device 100 includes a processor 410 (or processor 210 of FIG. 2), a display 420 (or display 260 of FIG. 2), and a sensor module 430 (or sensor module 240 of FIG. 2).

The display 420 may be configured in one or in plural. FIG. 4 illustrates two displays 420a and 420b, but the number of displays is not limited thereto. The display 420 may provide a display area in which an image or UI is displayed. The display 420 may include a touch screen that senses a touch input. The display 420 may display various screen configurations depending on an application that is executed. For example, if a camera application is executed, the display 420 may display an input image. If an image reproducing application is executed, the display 420 may display images stored in the electronic device 100 or images stored in an external device that may communicate with the electronic device 100 in various forms.

The sensor module 430 is a component for recognizing a change in various situations around or in the electronic device 100. The sensor module 430 may sense a touch of a user using a touch sensor. The sensor module 430 may be implemented as a touch pad separately provided from the display 420 and may also be implemented as a touch screen integrated with the display 420.

The sensor module 430 may sense the touch of the user and transmit the sensed touch to the processor 410 to change the state of the application that is being executed. Further, the sensor module 430 may sense various states of the display 420. For example, when the electronic device 100 is implemented as the plurality of displays 420, the sensor module 430 may sense whether all the plurality of displays 420 faces the same direction or at least one display 420 faces another direction.

The processor 410 is a component for controlling the operation of the display apparatus 100. The processor 410 may change the state of the application based on various signals received from the sensor module 430 and control the display 420 to display the changed state. For example, as illustrated in FIG. 1, when the display 420 displays an image, if a user inputs a specific signal, the sensor module 430 may sense an input signal of the user. The processor 410 may perform a designated function based on the input signal of the user received from the sensor module 430. That is, as illustrated in FIG. 1B, the icons 130 that may change the photographing setting may be displayed.

As such, if any signal is sensed by the sensor module 430 in the state in which the display 420 executes the application, the processor 410 may control the display 420 to change the image or the UI displayed on the display 420.

Figure 5:
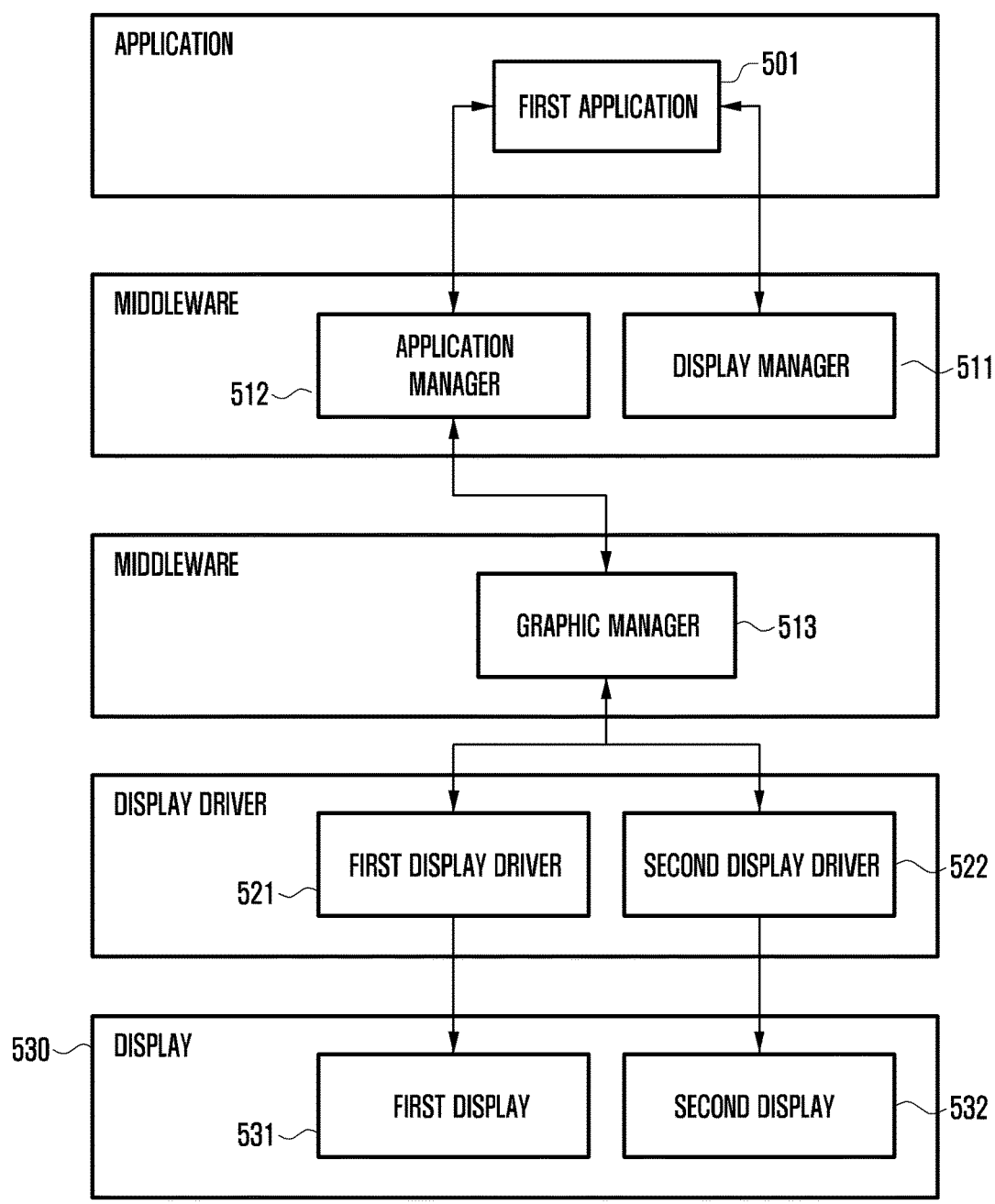
FIG. 5 is a schematic block diagram of a program module for controlling a plurality of displays, according to an embodiment of the present disclosure.
Figure 6:
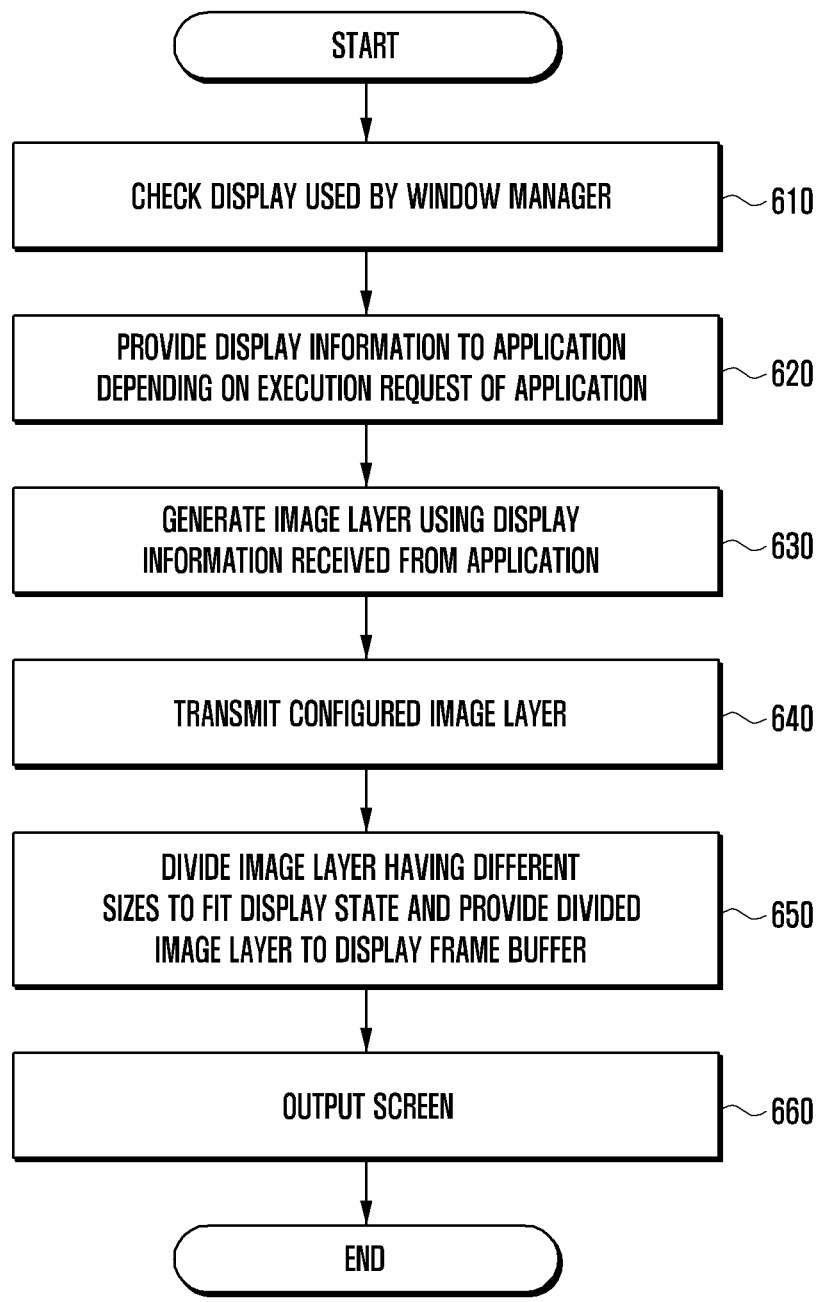
FIG. 6 is a flow chart of an operation of driving the plurality of displays, according to various embodiment of the present disclosure.

FIG. 5 is a schematic block diagram of a program module for controlling a plurality of displays 530. FIG. 6 is a flow chart of an operation of driving the plurality of displays 530.

The electronic device 100 divides content to be displayed on the plurality of displays 530 and the entire content displayed on the plurality of displays 530 will be described with reference to FIGS. 5 and 6.

According to an embodiment of the present disclosure, a display manager 511 according to a request of a first application 501 checks information and a state of the display 530 that is currently used by the electronic device 100 (step 610). The display manager 511 transmits the checked information of the display 530, for example, a size or a resolution of the display 530, information on whether the display 530 that is currently being driven corresponds to a first display 531 or a second display 532 to the first application 501 (step 620).

For example, the first application 501 may request the information on the display 530 to the display manager 511 in the following case.

When the first application 501 is performed, the first application 501 may request the information on the display 530 to make an executable image suited for the display 530.

Further, for example, the first application 501 may request the information on the display 530 to adapt various situations in which the image is reproduced. In detail, the first application 501 may request the information on the display 530 to divide one image and display the divided images on the plurality of displays 530, different images on the respective displays 530, display image edit icons on one display 531, and display an image to be reproduced on another display 532.

As such, various reproducing environments may be continuously changed by a selection of a user, and the like. Therefore, the first application 501 may request the information on the display 530 to display images, adapting the changing reproducing environments.

Further, for example, when the first application 501 is an application that reproduces an image, the display 530 (for example, first display 531 or second application 532) that reproduces an image may be turned off or the display 530 that is turned off may be turned on again. In this case, the first application 501 may request information on a current state of the display 530 to the display manager 511. However, the information which the first application 501 requests to the display manager 511 is not limited thereto.

According to an embodiment of the present disclosure, the first application 501 generates an image data to be displayed on the display 530 in an image layer form based on the information on the received display 530 (step 630). The first application 501 transmits the generated image layers to a graphic manager 513 through the application manager 512 (step 640).

According to an embodiment of the present disclosure, the graphic manager 513 may manage the image layers generated by the first application 501 as an image layer group to provide the generated image layers to frame buffers of display drivers 521 and 522 of each of the plurality of displays. For example, if an image composed of a plurality of image layers is displayed on the first display 531, the graphic manager 513 may group (for example, image layer stacks) the plurality of image layers and provide the grouped image layers to the first display driver 521.

According to an embodiment of the present disclosure, the graphic manager 513 divides the image data to be displayed, adapting a size or a current state (for example, activation state, relative connection state) of the plurality of displays 530 and provide the divided image data to the frame buffers of each of the display drivers 521 and 522 (step 650).

The display drivers 521 and 522 use the image data stored in the frame buffers of the display drivers to display the images on each of the displays 531 and 532 (step 660).

Hereinafter, an embodiment of displaying images on a plurality of displays according to the state change of the application will be described.

Figure 7A:
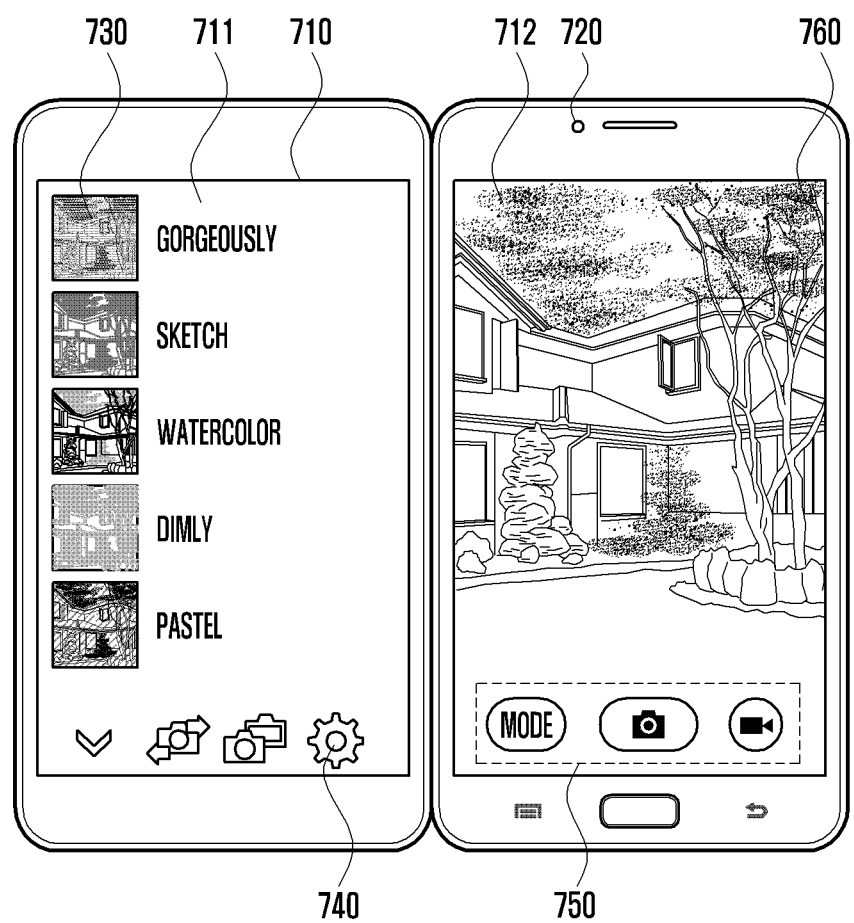
FIGS. 7A and 7B are diagrams illustrating a case in which different images are displayed on the plurality of displays, according to an embodiment of the present disclosure.
Figure 7B:
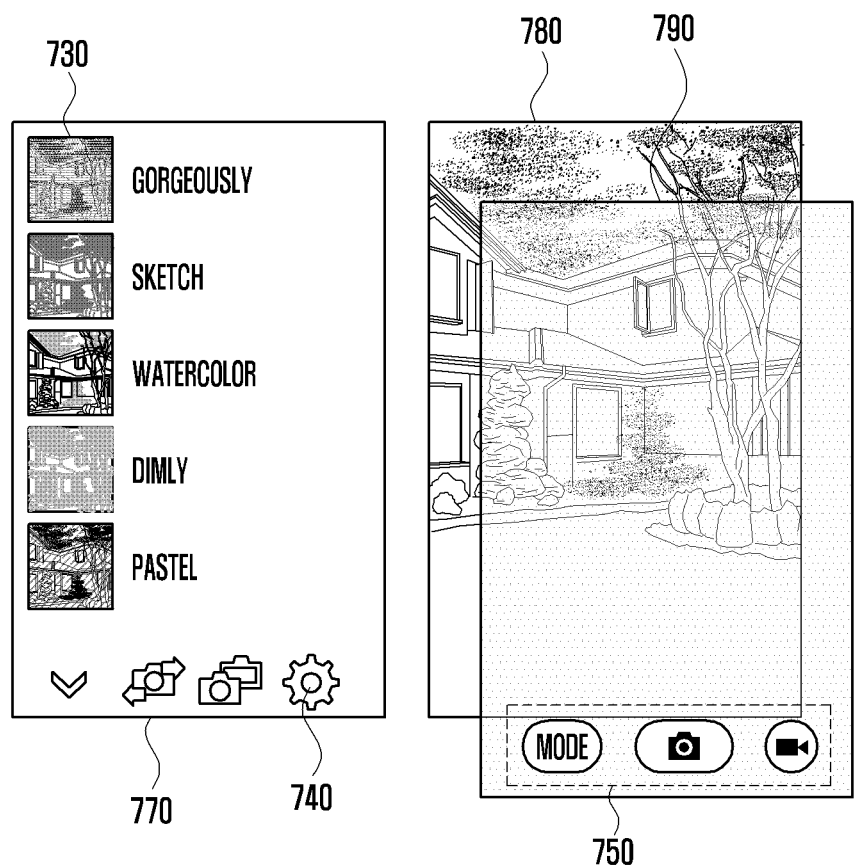

FIGS. 7A and 7B are diagrams illustrating a case in which different images are displayed on a plurality of displays.

For example, FIG. 7A illustrates a state in which the electronic device 100 performs the camera application. When the camera function is performed, the electronic device 100 may display an image input through a camera module 720 on a display 710. When an image is photographed, various setup icons that may be adjusted may be displayed on a first display 711. An image (such as live view 760) input through the camera 720 may be displayed on the second display 712 in real time.

An effect application icon 730 may apply various effects to the photographed image. For example, when a user selects an 'gorgeous' effect, the camera application may be displayed on the second display 712, while putting a weight to chroma, hue, tone, and the like of the input image. If a user selects a sketch, the camera application may display the input image on the display 712 as if he/she draws an edge portion of a subject with a pencil.

The setting icon 740 may change other setting values of the camera application or may be used when a camera module that the user wants is activated if a plurality of camera modules are present in the electronic device 100.

A photographing related icon 750 may be displayed on the second display 712, while overlapping the image input through the camera 720. However, the photographing related icon 750 may be separately allocated to a physical key of the electronic device 100 and may also be displayed on the display 710 separately from the input image.

The photographing related icon 750 may include a photographing icon photographing the input image, a mode icon that may change a photographing mode, a moving picture photographing icon that may photograph a moving picture, and the like.

FIG. 7B illustrates a state in which the image displayed on the display 710 in FIG. 7A is divided into an image layer and displayed.

Referring to FIG. 7B, the camera application may generate three image layers. A first image layer 770 may display the effect application icon 730 and the setting icon 740. A second image layer 780 may display the input image as a live view 760. A third image layer 790 may display the photographing related icon 750.

According to an embodiment of the present disclosure, the graphic manager 513 may divide and group three image layers so that the three image layers fit the state of the display and provide the grouped layers to the frame buffer of the display driver. In detail, the graphic manager 513 may synthesize the second image layer 780 and the third image layer 790 to be simultaneously displayed on the second display 712 into the image layer stack and provide the synthesized image layers to the frame buffer of the display driver.

FIG. 8 is a flow chart of an operation of the electronic device displaying different images on a display 730.

Referring to FIG. 8, a camera application 810 may generate three image layers having a size of full high definition (HD). According to an embodiment of the present disclosure, the camera application 810 may generate an image using activity. The activity is different operations included in the application and mean activity for generating an image to be displayed on the display 710.

According to an embodiment of the present disclosure, the first image layer 770 may be generated by a first activity 811 of the camera application 810 and the second image layer 780 and the third image layer 790 may be generated by a second activity 812. The camera application 810 may transmit the generated image layers to a graphic manager 820.

According to an embodiment of the present disclosure, the graphic manager 820 may divide or merge data included in the image layers 770, 780, and 790 to display an image on the first display 711 and the second display 712. For example, the first image layer 770 may be made into a first image layer stack 821 and the second image layer 780 and the third image layer 790 may be made into a second image layer stack 822. The graphic manager 820 may generate the first and second image layer stacks 821 and 822, respectively, by a first frame buffer 831 of a display driver and a second frame buffer 832 of the display driver and transmit the generated first and second image layer stacks 821 and 822 to the display driver 830. The display driver 830 may use the received frame buffers 831 and 832 of the display driver to display the image on a first display 841 and a second display 842, respectively.

In the electronic device 100 according to the embodiment of the present disclosure, the graphic manager 820 that belongs to a middleware stage in the program module may divide the image to be displayed on the display 840 in advance and transmit the divided images to the display driver 830. That is, when the display driver 830 performs the image dividing process, if the electronic device 100 updates an operating system (OS), there is a case in which the display driver 830 performs the image dividing process according to a command of the operating system (OS) only when the display driver 830 needs to be updated simultaneously. The image dividing process is performed in the middleware stage that belongs to the operating system (OS) of the electronic device 100, such that the electronic device 100 may perform the image dividing process regardless of the state of the display driver 830.

Figure 9A:
FIGS. 9A and 9B are diagrams illustrating a state in which an electronic device divides one image and displays the divided images on a plurality of displays, according to an embodiment of the present disclosure
Figure 9B:
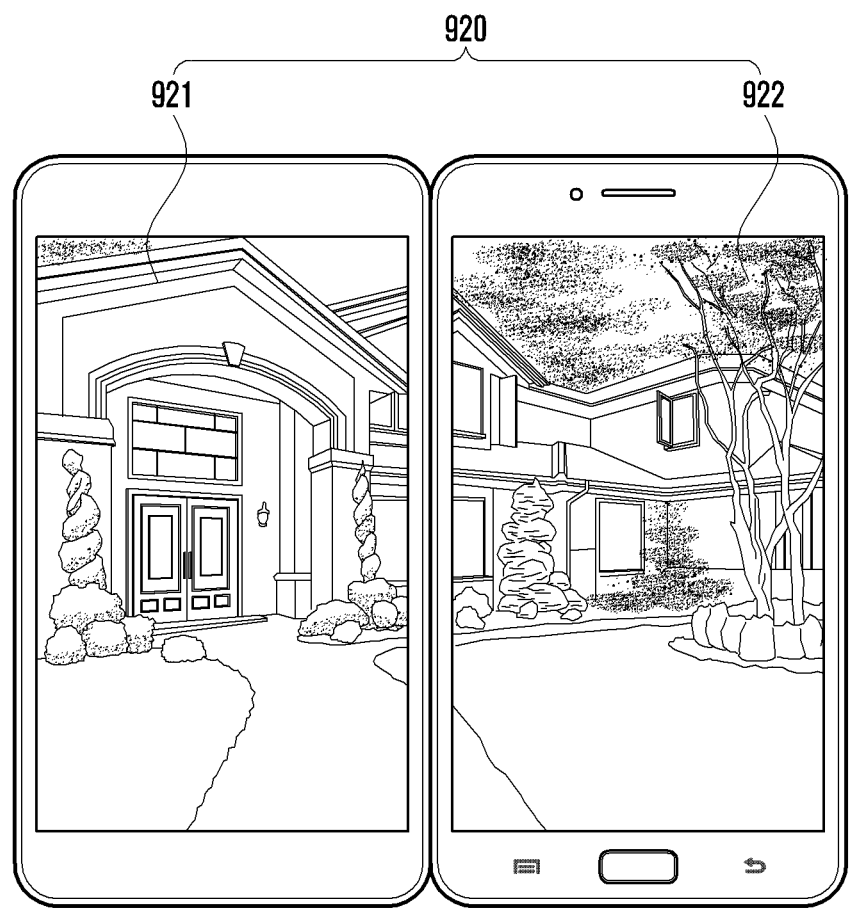

FIGS. 9A and 9B are diagrams illustrating a state in which the electronic device divides one image and displays the divided images on the plurality of displays.

FIG. 9A illustrates the entire image to be reproduced. Referring to FIG. 9B, the electronic device 100 may divide an image and display the divided images on the display 920. To divide one image and display the divided images on a plurality of displays 921 and 922, an application generates the entire image and the graphic manager divides the entire image and transmits the divided images to each display driver.

Figure 10:
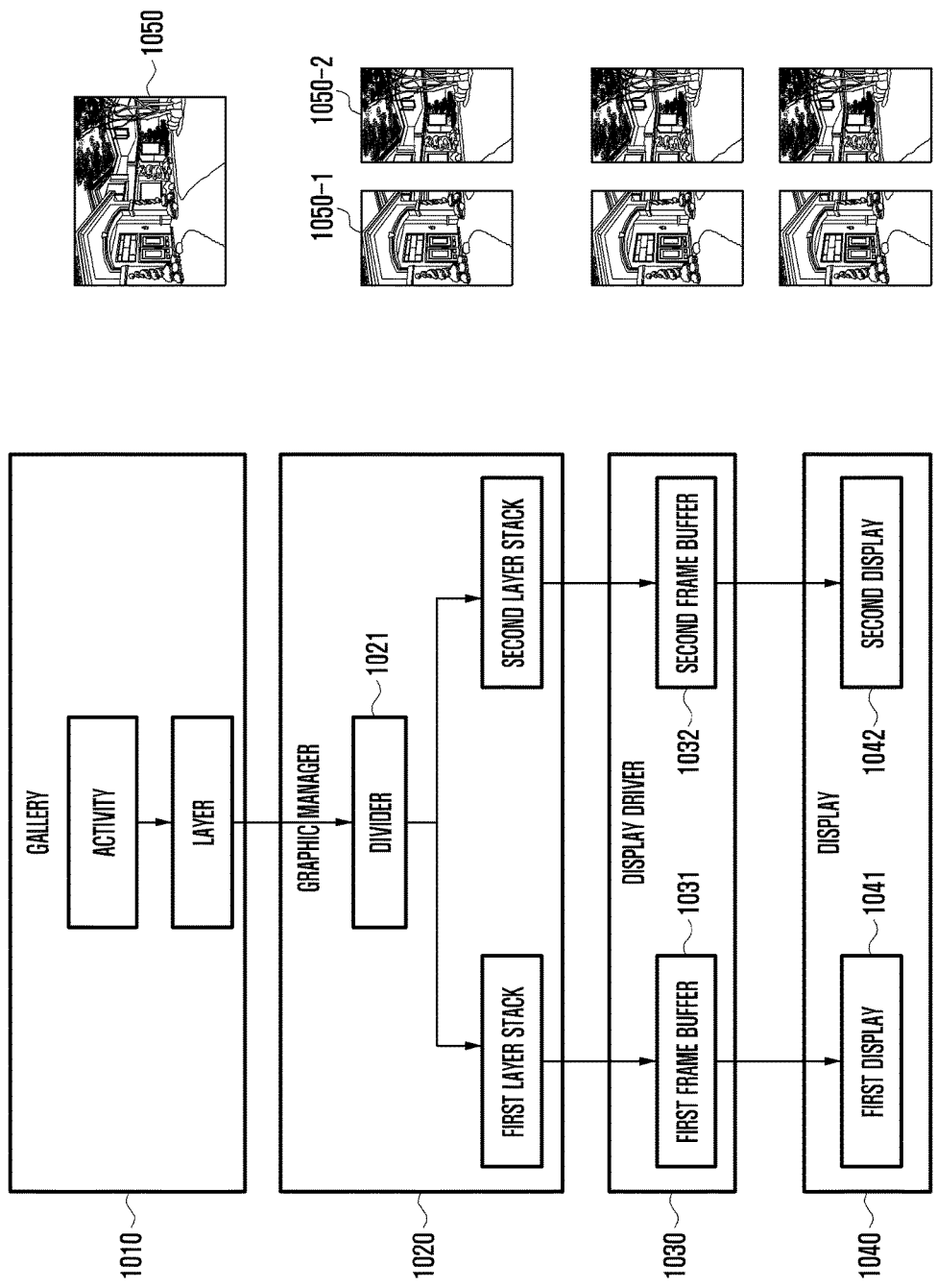
FIG. 10 is a flow chart of an operation of an electronic device dividing one image and displaying the divided images on a plurality of displays, according to an embodiment of the present disclosure.

FIG. 10 is a flowchart illustrating an operation of dividing one image and displaying the divided images on a plurality of displays 1040.

According to an embodiment of the present disclosure, an application 1010 may generate one image to be displayed on the display 1040. For example, the application 1010 may be a gallery application that reproduces the stored image. The gallery application 1010 may be stored in the electronic device 100 or may display the image stored in the external electronic device on the display 1040. The gallery application 1010 may generate one image layer 1050 so that it has capacity twice as large as the size of full HD. The gallery application 1010 may transmit the generated image layer 1050 to a graphic manager 1020.

According to an embodiment of the present disclosure, the graphic manager 1020 may further include a divider 1021 that divides an image. The divider 1021 may divide data to be displayed on each display, among data of the image layer 1050. That is, the divider 1021 may serve to divide an image layer, adapting the image to sizes of the plurality of displays, respectively, or characteristics such as resolutions thereof, and the like. For example, the divider 1021 may divide the image layer 1020, adapting to image to sizes or resolutions of a first display 1041 and a second display 1042.

According to an embodiment of the present disclosure, the graphic manager 1020 may process the data to be displayed on the first display 1041 among the divided data into a first image layer stack 1021 and process the data to be displayed on the second display 1042 into a second image layer stack 1022. The graphic manager 1020 transmits the generated first image layer stack 1021 and second image layer stack 1022 to a first frame buffer 1031 and a second frame buffer 1032.

According to an embodiment of the present disclosure, the display driver may use the first frame buffer 1031 to display an image on the first display 1041 and use the second frame buffer 1032 to display an image on the second display 1042.

In the electronic device 100 according to an embodiment of the present disclosure, the graphic manager 1020 that belongs to the middleware stage in the program module may divide the image to be displayed on the display 1040 in advance and transmit the divided image to the display driver 1030. That is, when the display driver 1030 performs the image dividing process, if the electronic device 100 updates an operating system (OS), there is a case in which the display driver 1030 performs the image dividing process according to a command of the operating system (OS) only when the display driver 1030 needs to be updated simultaneously. The image dividing process is performed in the middleware stage that belongs to the operating system (OS) of the electronic device 100, such that the electronic device 100 may perform the image dividing process regardless of the state of the display driver 1030.

Figure 11A:
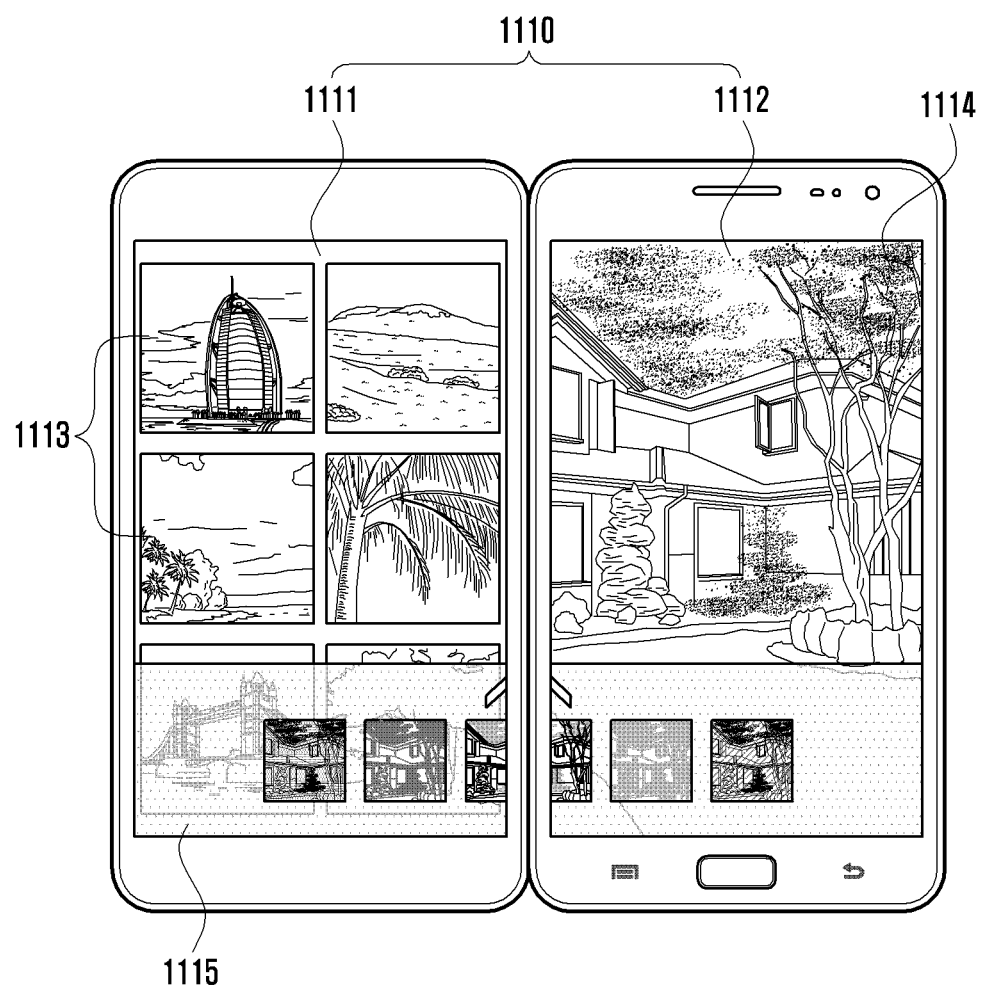
FIGS. 11A and 11B are diagrams illustrating a state in which an electronic device simultaneously displays different images on each of the displays while dividing one image and displaying the divided images on a plurality of displays, according to an embodiment of the present disclosure.
Figure 11B:
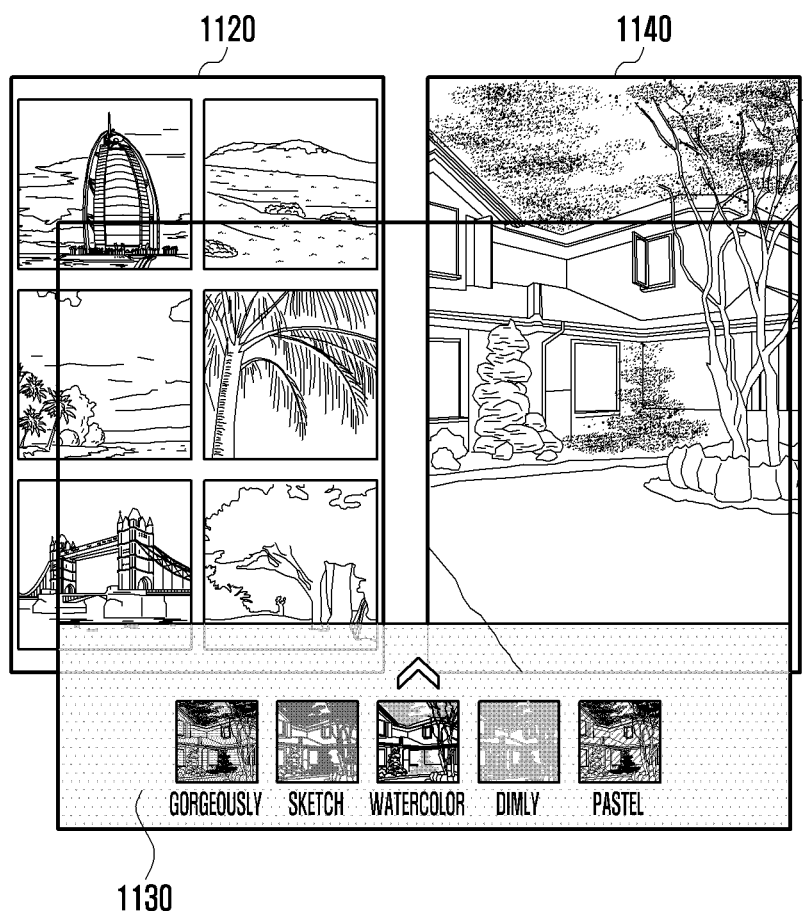

FIGS. 11A and 11B are diagrams illustrating a state in which the electronic device simultaneously displays different images on each of the displays 1111 and 1112 while dividing one image and displaying the divided images on a plurality of displays 1110.

Referring to FIG. 11A, the electronic device 100 may display a plurality of thumbnail images 1113 on the first display 1111, one large image on the second display 1112, and an icon 1115 that may edit an image over the first display 1111 and the second display 1112. The thumbnail images 1113 may be images displayed by reducing the images that are previously photographed and stored in the electronic device 100 to a smaller size. One large image 1114 may be one image selected by a user among the images that are previously photographed and stored in the electronic device 100 and may also be an image that is currently input through the camera of the electronic device 100.

According to an embodiment of the present disclosure, when executing the gallery application, the electronic device 100 may display an image as shown in FIG. 11A. The plurality of thumbnail images displayed on the first display 1111 may be a state in which images that may be selected by a user are displayed small. One image displayed on the second display 1112 may be an image selected by a user among the plurality of thumbnail images. An icon 1115 that may edit an image may apply various effects to the image displayed on the second display 1112 by a selection of a user.

FIG. 11B is a diagram illustrating a state in which the images displayed on the display 1110 is divided into an image layer and displayed.

Referring to FIG. 11B, a first image layer 1120 may include a plurality of thumbnail images. A second image layer 1130 may include the icon 1115 that may edit the image and may be displayed on both of the first display 1111 and the second display 1112. A third image layer 1140 may include one image. The image layers may be generated in the gallery application. The graphic manager may divide and group three image layers so that the three image layers fit the state of the display and provide the grouped image layers to the display frame buffer.

FIG. 12 is a flowchart illustrating a flow of an electronic device 100 displaying different images on the displays 1110 while dividing one image.

Referring to FIG. 12, the gallery application 1210 may generate two image layers 1120 and 1140 having the size of full HD and an image layer 1130 having a size twice as large as the size of full HD. The gallery application 1210 may generate the image layer through different operations included in the application.

According to an embodiment of the present disclosure, the application 1210 may generate the first image layer 1120 having the size of full HD by a first activity 1211. The gallery application 1210 may generate the second image layer 1130 having a size twice as large as the size of full HD by a second activity 1212. The gallery application 1210 may generate the third image layer 1140 having the size of full HD by a third activity 1213. The gallery application 1210 may transmit the generated image layers to a graphic manager 1220.

According to an embodiment of the present disclosure, the graphic manager 1220 may divide or merge data included in the image layers 1120, 1130, and 1140 to display images on the first display 1241 and the second display 1242, respectively. For example, the graphic manager 1220 may further include a divider 1221 that divides an image. The divider 1021 may serve to divide the image layer, adapting the images to the sizes of the plurality of displays, respectively, or characteristics such as the resolutions thereof, and the like. For example, the divider 1221 may divide the image layers, adapting the image layers to the size of the first display 1241 and the second display 1242. The divider 1221 may classify and divide the data to be displayed on the displays 1241 and 1242, respectively, among the data of the image layer 1130.

According to an embodiment of the present disclosure, the graphic manager 1220 may group the first image layer 1120 and a 2-1-th image layer 1130-1 divided by the divider 1221 to generate a first image layer stack 1222. The graphic manager 1220 may group the third image layer 1140 and a 2-2-th image layer 1130-2 divided by the divider 1221 to generate a second image layer stack 1223. The graphic manager 1220 transmits the first image layer stack 1222 and the second image layer stack 1223 to the first frame buffer 1231 and the second frame buffer 1232, respectively.

According to an embodiment of the present disclosure, the display driver 1230 may use the first frame buffer 1231 to display an image on the first display 1241 and use the second frame buffer 1232 to display an image on the second display 1242.

In the electronic device 100 according to the embodiment of the present disclosure, the graphic manager 1220 that belongs to the middleware stage in the program module may divide the image to be displayed on the display 1240 in advance and transmit the divided image to the display driver 1230. That is, when the display driver 1230 performs the image dividing process, if the electronic device 100 updates an operating system (OS), there is a case in which the display driver 1230 performs the image dividing process according to a command of the operating system (OS) only when the display driver 1230 needs to be updated simultaneously. The image dividing process is performed in the middleware stage that belongs to the operating system (OS) of the electronic device 100, such that the electronic device 100 may perform the image dividing process regardless of the state of the display driver 1230.

FIG. 13 is a diagram illustrating a method for displaying an image when a connection state of the display 1310 is changed in the state in which the images are displayed on the plurality of displays 1310.

A display direction of one display 1311 may be changed by a user operation in the state in which the images are displayed on the plurality of displays 1310. If the user changes the display direction of the first display 1311, the electronic device 100 may use a sensor module 430 to recognize the change in the display direction. According to an embodiment of the present disclosure, the electronic device 100 may use a sensor (for example, hall sensor) to recognize that the first display 1311 is changed from a first direction to a second direction.

For example, the first direction may be a direction in which the display 1310 of the electronic device 100 faces a user. For example, the second direction may be a direction in which the display 1310 of the electronic device 100 does not face a user.

The electronic device 100 may recognize a direction in which the display 1310 faces a user using a camera. The electronic device 100 may include a camera at a surface on which the second display 1312 is present The camera may analyze an input image to determine a human face and may also recognize a user's face if the pre-stored facial image data are present. Therefore, the electronic device 100 may determine whether the display 1310 faces the user.

When the first direction in which the first display 1311 faces the user is changed to the second direction in which the first display 1311 does not face the user, the first display 1311 may not display an image. In this case, the first display 1311 may turn off a power supply to reduce power consumption.

According to an embodiment of the present disclosure, when the first display 1311 is changed in the second direction in which it does not face the user, exceeding a threshold value, the electronic device 100 may turn off the power supply for the first display 1311. The threshold value may be an angle that may be previously set by a manufacturer. Further, the threshold value may also be set by the user entering a menu setting of the electronic device 100.

When the power supply for one display 1311 is turned off in the state in which the images are displayed on the plurality of displays 1310, the method for displaying the images will be described.

Figure 13A:
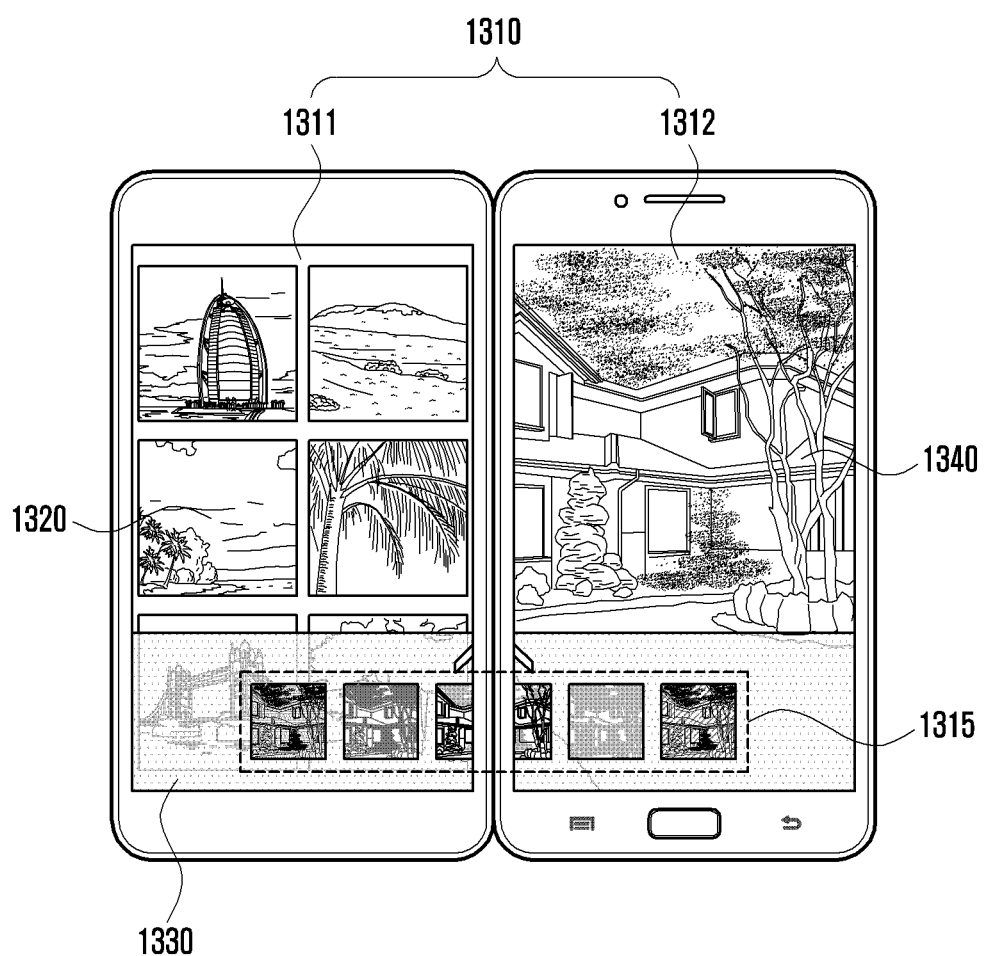
FIGS. 13A to 13D are diagrams illustrating a method for displaying an image when a connection state of the display is changed in the state in which the electronic device displays the image on a plurality of displays, according to an embodiment of the present disclosure.

FIG. 13A is a diagram illustrating the state in which the images are displayed on the plurality of displays 1310. The plurality of thumbnail images may be displayed on the first display 1311. One large image may be displayed on the second display 1312. An icon 1315 correcting the image may be displayed over the first display 1311 and the second display 1312.

Figure 13B:
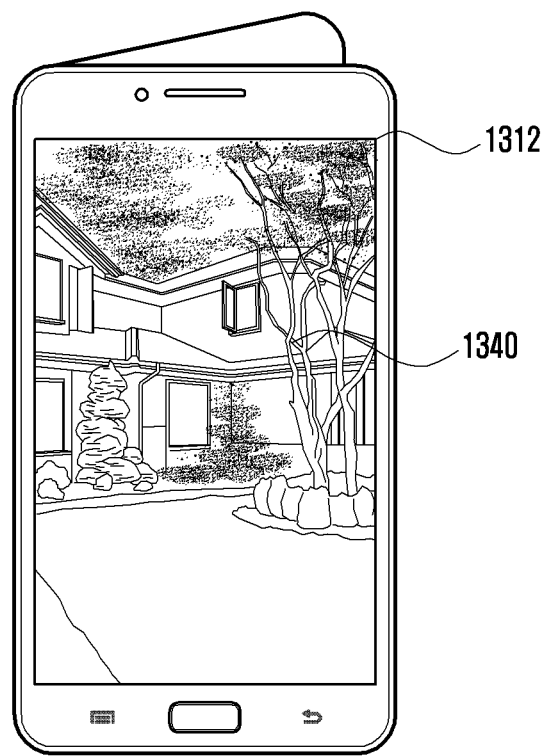
Figure 13C:
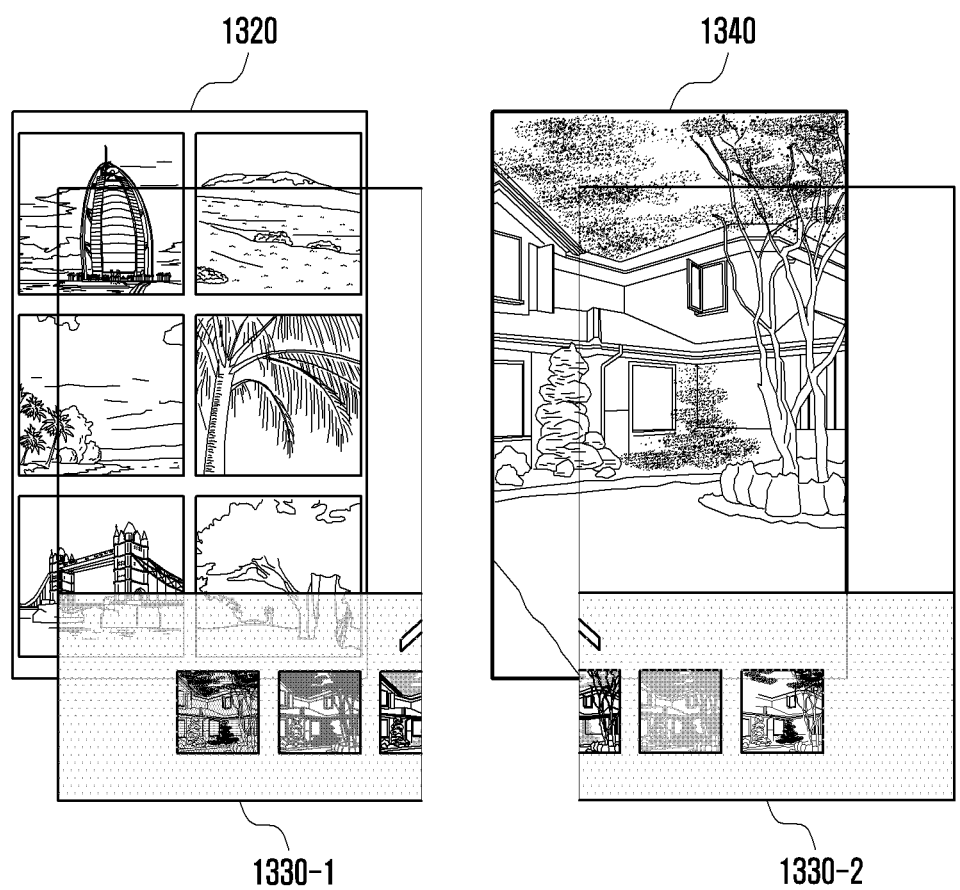

As illustrated in FIGS. 13A and 13C, the electronic device 100 may generate the image layer and display the generated image layer on the display 1310. In detail, the first display 1311 may display a first image layer 1320 and a 2-1-th image layer 1330-1 and the second display 1312 may display a 2-2-th image layer 1330-2 and a third image layer 1340. The 2-1-th image layer 1330-1 and the 2-2-th image layer 1330-2 are image layers divided to adapt the size or the resolutions of the displays 1311 and 1312, respectively. The first image layer 1320 and the third image layer 1340 may have the size of full HD. The second image layer 1330 may have a size twice as large as the size of full HD.

If the user changes the direction of the first display 1311 and thus the electronic device 100 turns off the power to the first display 1311, as illustrated in FIG. 13B, the electronic device 100 may use only the third image layer 1340 to display the image on the second display 1312. The operation will be described in detail with reference to FIG. 13D.

Figure 13D:
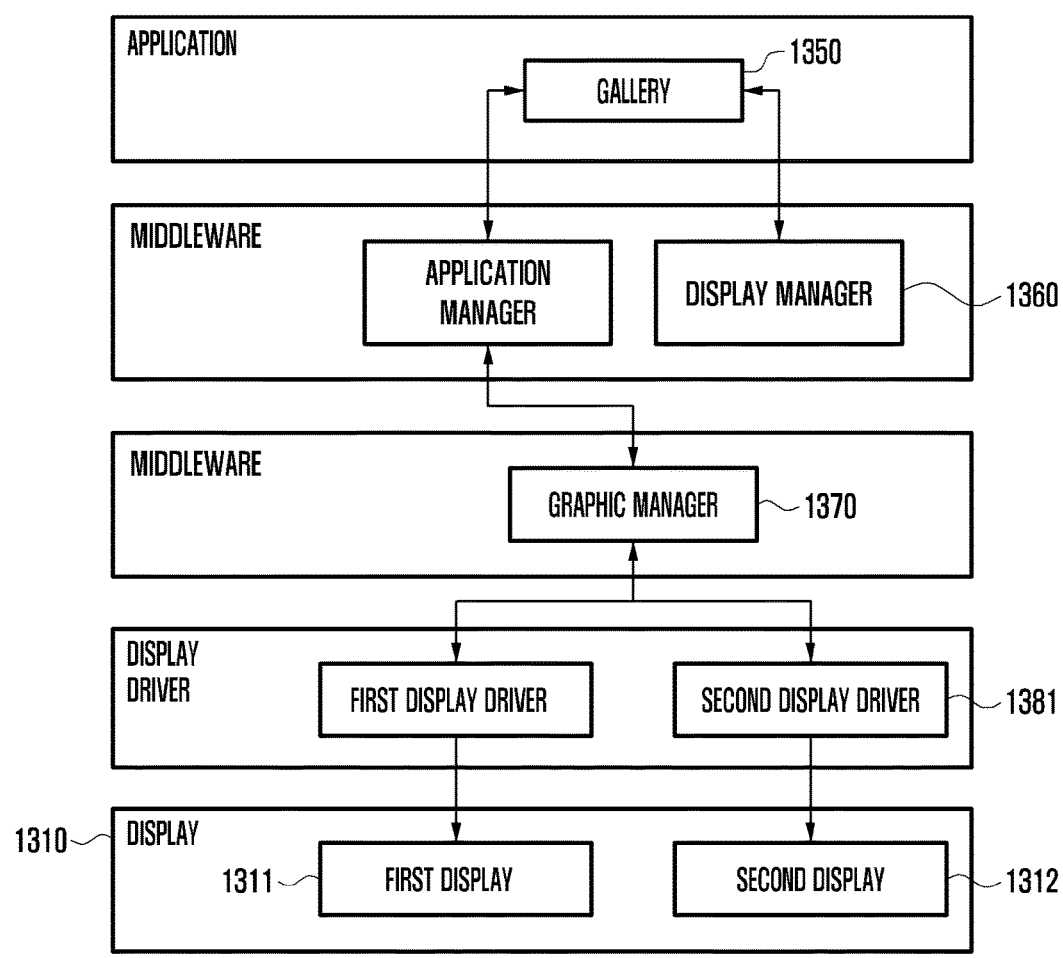

Referring to FIG. 13D, a display manager 1360 may check a current state of the display 1310. The sensor module 430 may sense the rotation of the first display 1311 to turn off the power supply to the first display 1311. The display manager 1360 may check that the power supply to the first display 1311 is turned off. The display manager 1360 may transmit the fact that the state of the first display 1311 is changed to a graphic manager 1370.

The graphic manager 1370 may recognize that the power supply for the first display 1311 is turned off and adjust the image layers. For example, the graphic manager 1370 may remove the first image layer 1320 that is displayed on the first display 1311. The graphic manager 1370 may remove the second image layer 1330 that is displayed on the first display 1311 and the second display 1312.

According to an embodiment of the present disclosure, the gallery application 1350 may check that the power supply to the first display 1311 is turned off from the display manager 1360. In this case, the gallery application 1350 may not generate the first image layer 1320 and the second image layer 1330 that are displayed on the first display 1311. Therefore, the gallery application 1350 may reduce resources that generate the first image layer 1320 and the second image layer 1330.

The graphic manager 1370 may continuously transmit the third image layer 1340 displayed on the second display 1312 to a second display driver 1381.

According to an embodiment of the present disclosure, the graphic manager 1370 may transmit the third image layer 1340 to the frame buffer of the second display driver 1381. The second display driver 1381 may use the frame buffer to display the image on the second display 1312.

The embodiments of FIGS. 13A to 13D describe the case in which the state of the first display and the second display is changed from a first state to a second state, but are not limited thereto. On the contrary, the embodiments of FIGS. 13A to 13D may also be used for the case in which the state of the first display and the second display is changed from the second state to the first state.

FIGS. 14A to 14D are diagrams illustrating another method for displaying an image when the connection state of the displays 1410 is changed in the state in which the images are displayed on the plurality of displays 1410.

Figure 14A:
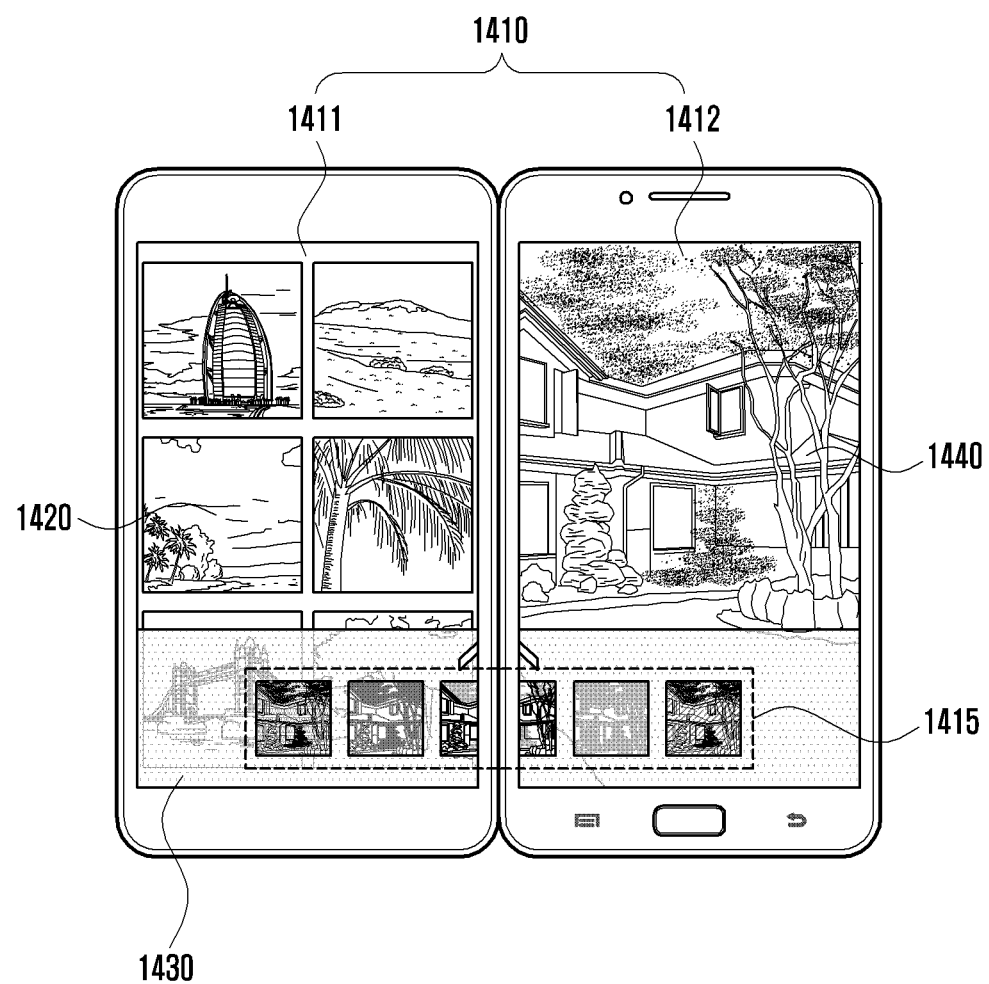
FIGS. 14A to 14D are diagrams illustrating another method for displaying an image when a connection state of the display is changed in which an electronic device displays the image on the plurality of displays, according to an embodiment of the present disclosure.

FIG. 14A is a diagram illustrating the state in which the images are displayed on the plurality of displays 1410. The description of FIG. 14A is already described in FIG. 13A, and therefore the detailed description thereof will be omitted.

Figure 14B:
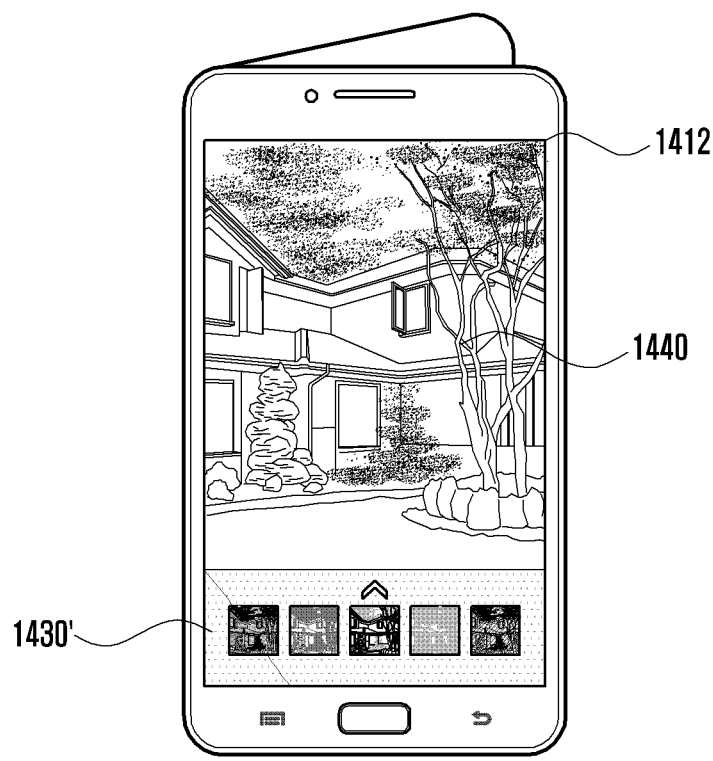
Figure 14C:
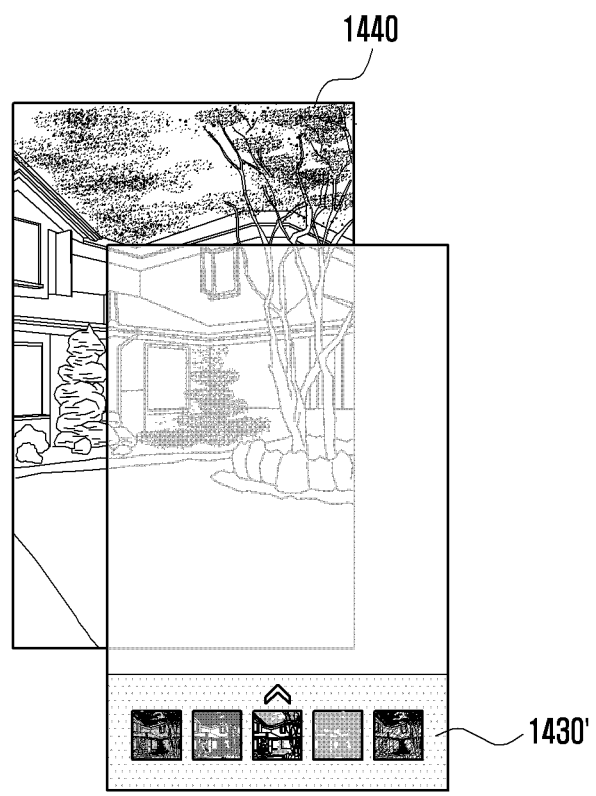

When the change in the direction of the first display 1411 by the user is sensed, the electronic device 100 may turn off the power supply to the first display 1411. Next, as illustrated in FIGS. 14B and 14C, the electronic device 100 may use the third image layer 1440 and the second image layer 1430 having the size changed to display an image on the second display 1412. The operation will be described in detail with reference to FIG. 14D.

Figure 14D:
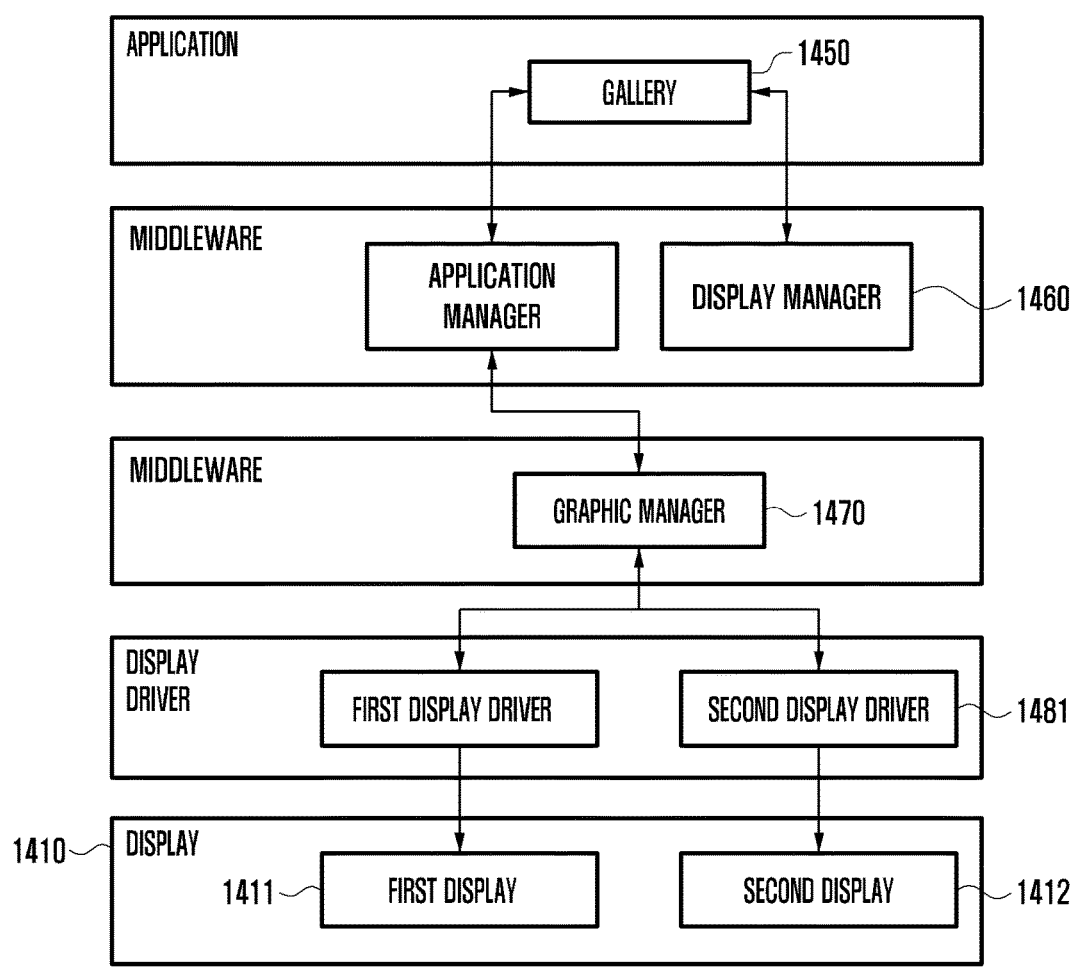

Referring to FIG. 14D, a display manager 1460 may check a current state of the display 1410. The sensor module 430 may sense the rotation of the first display 1411 to turn off the power supply to the first display 1411. The display manager 1460 may check that the power supply to the first display 1411 is turned off. The display manager 1460 may transmit the fact that the state of the first display 1411 is changed to a graphic manager 1470.

The graphic manager 1470 may recognize that the power supply to the first display 1411 is turned off and adjust the image layers. For example, the graphic manager 1470 may remove the first image layer 1411 that is displayed on the first display 1420.

According to an embodiment of the present disclosure, the gallery application 1450 may check that the power supply to the first display 1411 is turned off from the display manager 1460. In this case, the gallery application 1450 may not generate the first image layer 1420 that is displayed on the first display 1311. Therefore, the gallery application 1450 may reduce resources that generate the first image layer 1420.

The graphic manager 1470 may change the size of the second image layer 1430 that is displayed on the first display 1411 and the second display 1412. The gallery application 1450 may newly generate the second image layer 1430 having the size of full HD, instead of the second image layer 1430 having a size twice as large as the size of full HD. The gallery application 1450 may transmit the third image layer 1440 and the newly generated second image layer 1430 to the graphic manager 1470.

According to an embodiment of the present disclosure, the graphic manager 1470 may transmit the third image layer 1440 and the second image layer 1430 to the frame buffer of the second display driver 1481. The second display driver 1481 may use the frame buffer to display the image on the second display 1412.

In the electronic device 100 according to an embodiment of the present disclosure, the graphic manager 1470 may divide the image to be displayed on the display 1410 in advance and transmit the divided image to the display driver 1480. Further, when one display is not used, the graphic manager 1470 deletes the unnecessary image layer or the layer stack or does not transmit it to the display driver 1480 to prevent the waste of resources to generate and transmit the unnecessary data.

The embodiments of FIGS. 14A to 14D describe the case in which the state of the first display and the second display is changed from a first state to a second state, but are not limited thereto. On the contrary, the embodiments of FIGS. 14A to 14D may also be used for even the case in which the state of the first display and the second display is changed from the second state to the first state.

FIGS. 15A to 15D are diagrams illustrating a state in which the images displayed on the first display (for example, 1311 of FIGS. 14A to 14D) and the second display (for example, 1412 of FIGS. 14A to 14D) are displayed on the second display (for example, 1412 of FIGS. 14A to 14D) while the sizes of the images are changed. According to an embodiment of the present disclosure, the electronic device 100 may display the second image layer 1430 having a size twice as large as the size of full size made by the gallery application 1450 which gradually disappears and the second image layer 1430 having the size of full HD appears on the second display 1412 in an animated form.

Figure 15A:
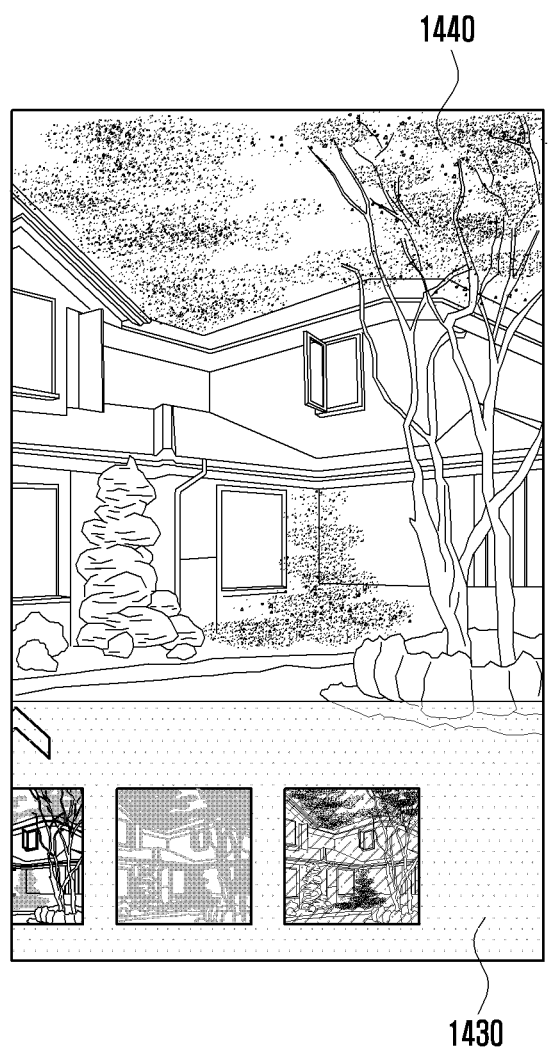
FIGS. 15A to 15D are diagrams illustrating a state in which a size of the image displayed on a first display and a second display of an electronic device is changed, according to an embodiment of the present disclosure.

Referring to FIG. 15A, the electronic device 100 may display only half of the right of the third image layer 1440 and the second image layer 1430 on the second display (for example, 1412 of FIGS. 14A to 14D).

Figure 15B:
Figure 15C:
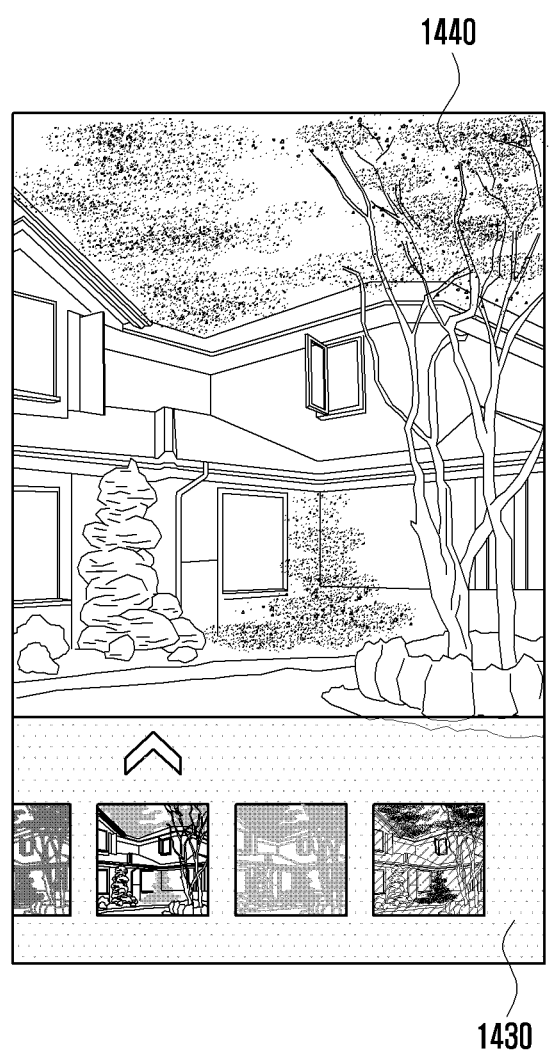

Referring to FIG. 15B, the electronic device 100 may display a more central portion of the second image layer 1430 on the second display 1412. Referring to FIG. 15C, the electronic device 100 may display a more central portion of the second image layer 1430 on the second display 1412.

Figure 15D:
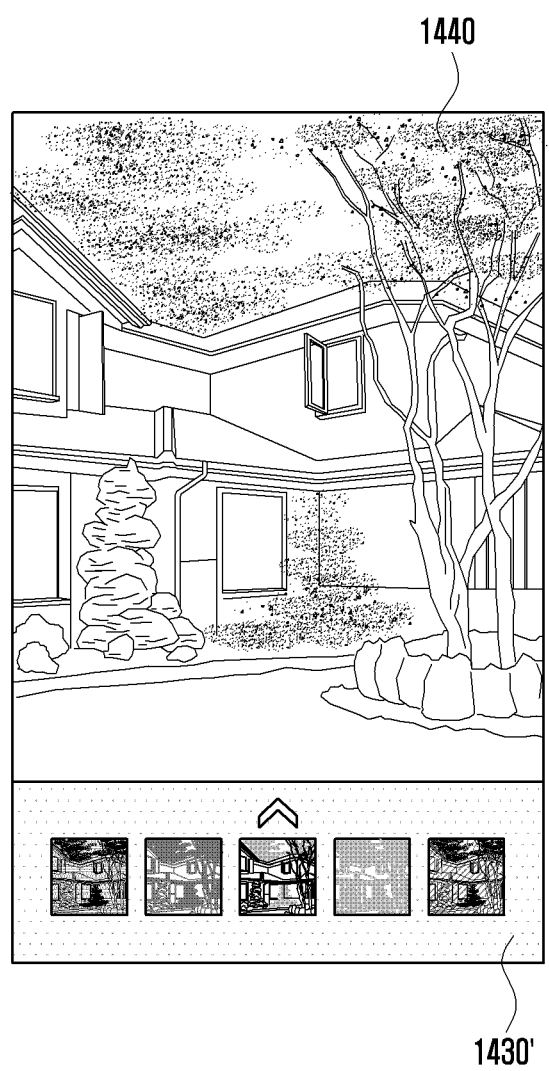

Referring to FIG. 15D, the electronic device 100 may display the third image layer 1440 and the second image layer 1430 newly generated at the size of full HD on the second display. That is, the second image layer 1430 gradually moves to the right of the second display 1412 and thus displays the second image layer 1430. The electronic device 100 may provide aesthetic pleasure using the electronic device 100 to the user using the animation effect.

Figure 16A:
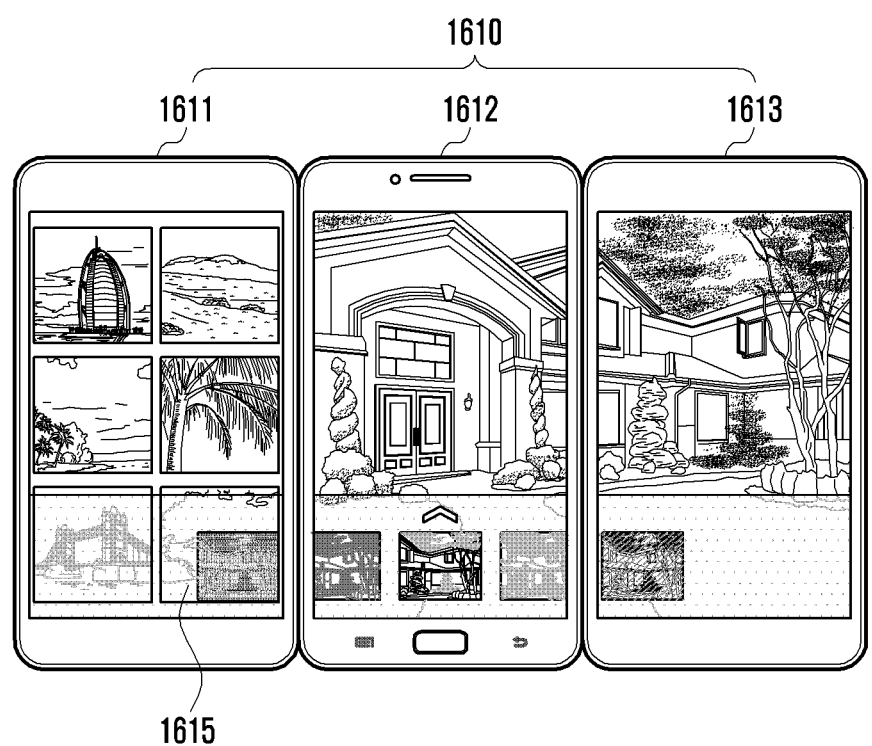
FIGS. 16A and 16B are diagrams illustrating a state in which an electronic device simultaneously displays different images while dividing one image and displaying the divided images on three displays, according to an embodiment of the present disclosure.
Figure 16B:
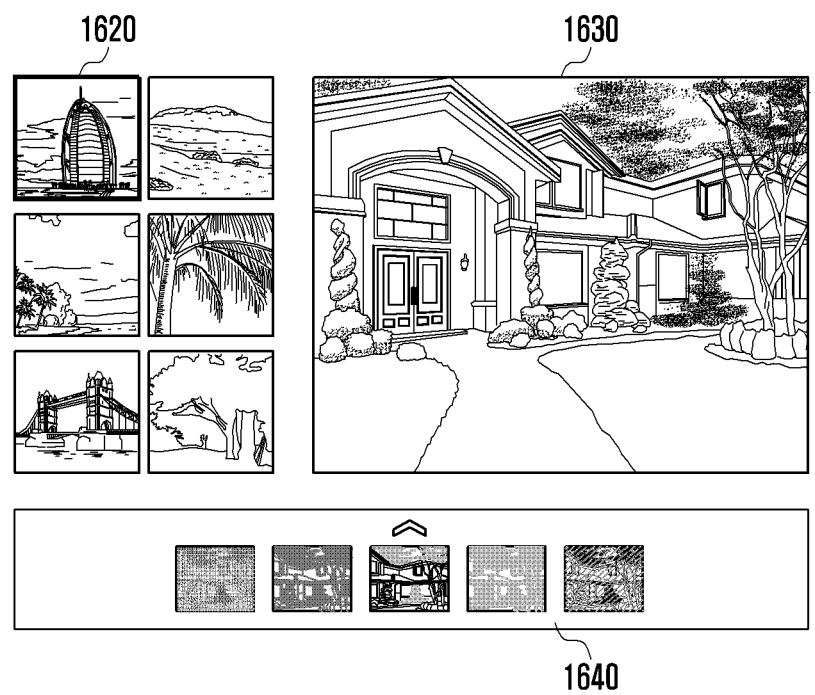

FIGS. 16A and 16B are diagrams illustrating different images displayed at the same time by dividing one image and displaying the divided images on three displays 1610.

Referring to FIG. 16A, the electronic device 100 displays a plurality of thumbnail images on a first display 1611, divides one large image and displays the divided images on a second display 1612 and a third display 1613, and divides an icon 1615 that may edit an image on the display 1610 and displays the divided icons on the display 1610.

According to an embodiment of the present disclosure, when executing the gallery application, the electronic device 100 may display an image in FIG. 16A. The plurality of thumbnail images displayed on the first display 1611 may be a state in which images that may be selected by a user are displayed small. One image divided and displayed on the second display 1612 and the third display 1613 may be an image selected by a user among the plurality of thumbnail images. An icon 1615 that may edit the image may be divided and displayed on the first display 1611, the second display 1612, and the third display 1613. The icon 1615 that may edit an image may apply various effects to the image displayed on the second display 1612 and the third display 1613 by the selection of the user.

FIG. 16B is a diagram illustrating a state in which the images displayed on the display 1610 are divided into image layers and displayed.

Referring to FIG. 16B, a first image layer 1620 may include a plurality of thumbnail images. A second image layer 1630 may include one image selected by the user and may be divided and displayed on the second display 1612 and the third display 1613. A third image layer 1640 may include the icon 1615 that may edit the image and may be displayed on the first display 1611, the second display 1612, and the third display 1613.

Figure 17:
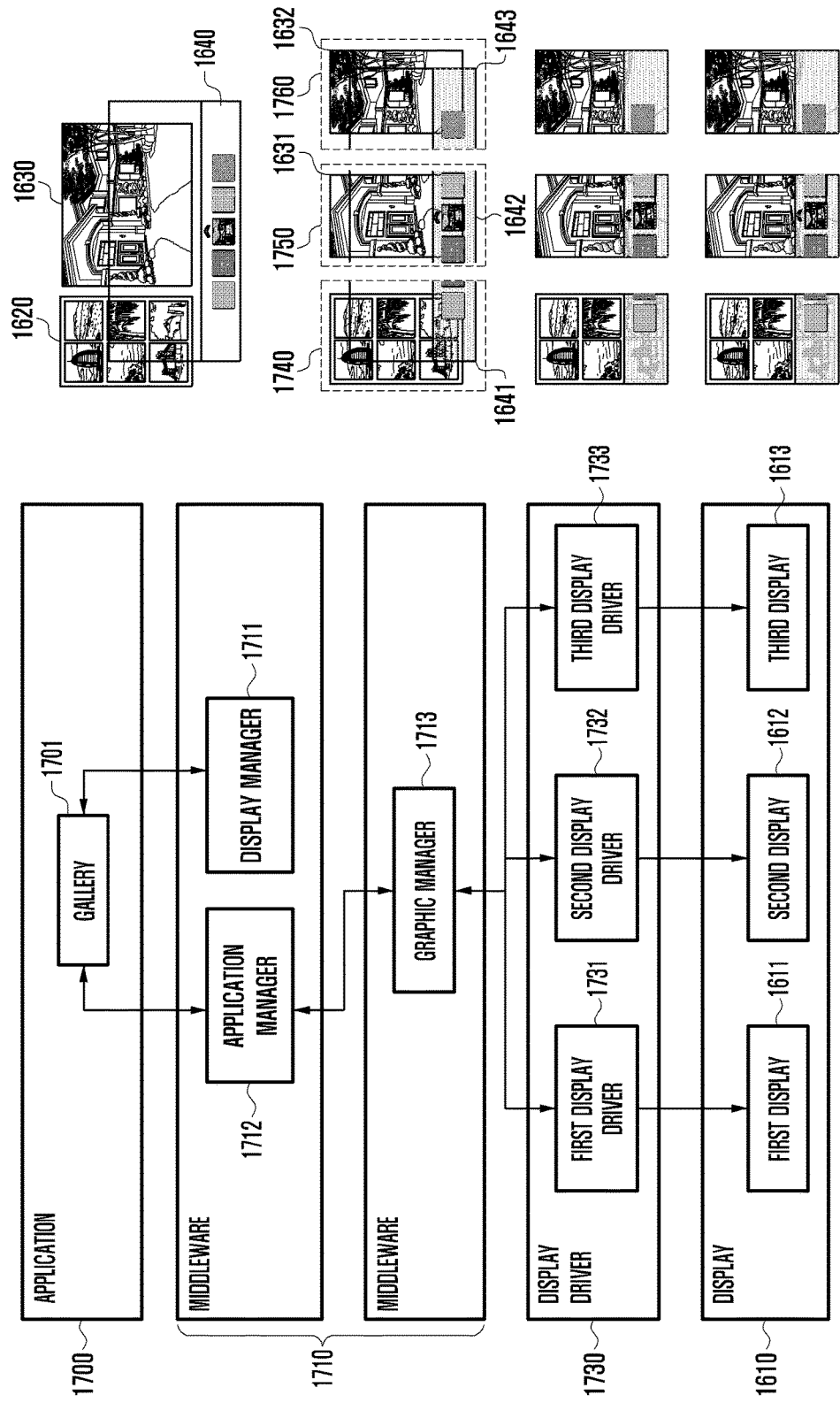
FIG. 17 is a flow chart illustrating an operation of an electronic device simultaneously displaying different images while dividing one image and displaying the divided images on three displays, according to an embodiment of the present disclosure.

FIG. 17 is a flow chart illustrating an operation of an electronic device simultaneously displaying different images while dividing one image and displaying the divided images on three displays 1610.

Referring to FIG. 17, a display manager 1711 may check information and a state of the display 1610 currently used by the electronic device 100. The display manager 1711 may transmit information on the checked display 1610, for example, sizes of the displays 1610 to a gallery application 1701.

According to an embodiment of the present disclosure, the gallery application 1701 may generate image layers to be displayed on the display 1610 based on the image data to be displayed on the display 1610 depending on the received information of the display 1610. For example, the gallery application 1701 may generate the first image layer 1620 having the size of full HD, the second image layer 1630 having a size twice as large as the size of full HD, and the third image layer 1640 having a size three times as large as the size of full HD. The gallery application 1701 may transmit the generated image layers to a graphic manager 1713 through an application manager 1712.

According to an embodiment of the present disclosure, the graphic manager 1713 may adjust the sizes of the image layers to generate images fitting the displays 1611, 1612, and 1613, respectively. For example, the graphic manger 1713 may divide the second image layer 1630 into a 2-1-th image layer 1631 and a 2-2-th image layer 1632 that have the size of full HD.

According to an embodiment of the present disclosure, the graphic manger 1713 may divide the third image layer 1640 into a 3-1-th image layer 1641, a 3-2-th image layer 1642, and a 3-3-th image layer 1643 that have the size of full HD.

According to an embodiment of the present disclosure, the graphic manager 1713 may group each of the divided image layers into the image layer stack so that the divided image layers fit the display 1610 on which they will be displayed. For example, the first image layer 1620 and the 3-1-th image layer 1641 may be grouped into image layer stack 1 1740. The 2-1-th image layer 1631 and the 3-2-th image layer 1642 may be grouped into image layer stack 2 1750. The 2-2-th image layer 1632 and the 3-3-th image layer 1643 may be grouped into image layer stack 3 1760.

According to an embodiment of the present disclosure, the graphic manager 1713 may transmit the generated image layer stacks to the frame buffers of each of the display drivers 1731, 1732 and 1733 and the display drivers 1731, 1732 and 1733 may display images on each of the displays 1611, 1612 and 1613 using the image layer stacks stored in the frame buffer.

As such, in the electronic device 100 according to the embodiment of the present disclosure, the graphic manager 1713 that belongs to the middleware stage in the program module may divide the image to be displayed on the display 1610 in advance and transmit the divided image to the display driver 1730. That is, when the display driver 1730 performs the image dividing process, if the electronic device 100 updates an operating system (OS), there is a case in which the display driver 1730 performs the image dividing process according to a command of the operating system (OS) only when the display driver 1730 needs to be updated simultaneously. The image dividing process is performed in the middleware stage that belongs to the operating system (OS) of the electronic device 100, such that the electronic device 100 may perform the image dividing process regardless of the state of the display driver 1730.

According to an embodiment of the present disclosure, the electronic device includes a processor for executing an application, a first display and a second display, a first display driver for controlling the first display and a second display driver for controlling the second display, and a memory for storing a data management module, in which the data management module may receive the content to be displayed in association with the execution of the application from the application and designates the content as a first content and a second content, and transmit the first content to the first display driver and the second content to the second display driver.

According to an embodiment of the present disclosure, the first display driver may be set to display the first content using the first display and the second display driver may be set to display the second content using the second display.

According to an embodiment of the present disclosure, the data management module may be performed in a software layer different from the application and the first and second display drivers.

According to an embodiment of the present disclosure, the data management module may form at least a part of middleware.

According to an embodiment of the present disclosure, the content may be set to be generated using attributes determined based on the situation information associated with the electronic device or the content and the application.

According to an embodiment of the present disclosure, the situation information may include an activation state of the first display and the second display, an interconnection state therebetween, the executable state of the application, or a combination thereof.

According to an embodiment of the present disclosure, the electronic device includes a plurality of displays, a processor electrically connected to the plurality of displays, and a memory electrically connected to the processor, in which upon execution, the memory may store the middleware to allow the processor to divide the content data to be displayed on the plurality of displays, respectively, and transmit the divided content data to the display drivers of the plurality of displays, respectively.

According to an embodiment of the present disclosure, upon the execution, the middleware may divide the content data to be displayed on the plurality of displays based on at least one of the execution of the application, the change in the content reproducing state of the application which is being executed, and the change in the interconnection state of the plurality of displays.

According to an embodiment of the present disclosure, the change in the content reproducing state of the application may be at least one of the case in which different content are displayed on the plurality of displays, the case in which one content is divided and displayed, and the case in which different content and one content are divided and simultaneously displayed.

According to an embodiment of the present disclosure, upon execution, the middleware may allow the processor to divide the content data to be displayed on the plurality of displays, respectively and transmit the content data grouping the content layers configuring the content to be displayed on the plurality of displays, respectively, to the display drivers of the plurality of displays, respectively.

According to an embodiment of the present disclosure, at least one of the content to be displayed on the plurality of displays, respectively, may be a content received from outside of the electronic device and at least another of the content may be a content generated from the electronic device.

According to an embodiment of the present disclosure, the change in the interconnection state of the plurality of displays may be at least one of the case in which at least one display is changed in a direction different from the other displays in the state in which the plurality of displays face the same direction and the case in which the state in which at least one of the plurality of displays faces a direction different from the other displays is changed to the state in which the plurality of displays all face the same direction.

According to an embodiment of the present disclosure, upon execution, the middleware may allow the processor not to transmit the content data to be displayed on the display of which the direction is changed to the display driver of the display of which the direction is changed and transmit the content data to be displayed on the display of which the direction is not changed to the display drivers of the displays, respectively, of which the directions are not changed, in response to the change that at least one display is changed in a direction different from the other displays in the state in which the plurality of displays face the same direction.

According to an embodiment of the present disclosure, the change that at least one display is changed in a direction different from the other displays in the state in which the plurality of displays face the same direction may determine that the change occurs when the at least one display moves beyond a preset value.

According to an embodiment of the present disclosure, upon execution, the middleware may allow the processor to transmit the content data to be displayed on the display of which the direction is not changed among the content simultaneously displayed on the plurality of displays to the display drivers of each of the displays of which the directions are not changed while the size of the content data displayed on the display is changed.

According to an embodiment of the present disclosure, a method for controlling a display of an electronic device includes dividing, by the middleware stored in the electronic device, the content data to be displayed on the plurality of displays, respectively, and transmitting, by the middleware stored in the electronic device, the content data to the display drivers of the plurality of displays, respectively, and transmitting, by the display driver, the content data to the at least one display to display the content.

According to an embodiment, of the present disclosure, the operation of dividing the content data to be displayed on the plurality of displays may further include the case in which the application is executed, the case in which the content reproducing state of the application is changed, and the case in which the connection state of the plurality of applications is changed.

According to an embodiment of the present disclosure, the change in the content reproducing state of the application may be at least one of the case in which different content are displayed on the plurality of displays, the case in which one content is divided and displayed, and the case in which different contents and one content are divided and simultaneously displayed.

According to an embodiment of the present disclosure, upon execution, the method for controlling a display of an electronic device may further include the dividing the content data to be displayed on the plurality of displays, respectively and transmitting the content data grouping the image layers configuring the content to be displayed on the plurality of displays, respectively, to the display drivers of the plurality of displays, respectively.

According to an embodiment of the present disclosure, the change in the connection state of the plurality of displays may be at least one of the case in which at least one display is changed in the direction different from the other displays, in the state in which the plurality of displays face the same direction and the case in which the state in which at least one display faces the direction different from the other displays is changed to the state in which all the displays face the same direction.

According to an embodiment of the present disclosure, upon execution, the middleware may further include not transmitting the content data to be displayed on the display of which the direction is changed and transmitting the content data to be displayed on the display of which the direction is not changed to the display driver, when at least one display is changed in the direction different from the other displays in the state in which the plurality of displays face the same direction.

According to an embodiment of the present disclosure, the middleware may further include transmitting the content data to be displayed on the display of which the direction is not changed among the contents simultaneously displayed on the plurality of displays to the display driver of the display of which the direction is not changed while the size of the content data to be displayed on the display of which the direction is changed.

According to an embodiment of the present disclosure, a non-transitory recording medium is provided in which middleware for executing the method for controlling a display of an electronic device, upon execution, includes dividing, by the processor of the electronic device, the content data to be displayed on the plurality of displays, respectively and transmitting the divided content data to the display drivers of the plurality of displays, respectively, in which the display driver transmits the content data to the at least one display to display the content.

As described above, according to an embodiment of the present disclosure, when the electronic device 100 having a plurality of displays divides the image and displays the divided images, it may reduce the amount of computing and memory resources needed and reduce power consumption.

The method for controlling a display according to an embodiment of the present disclosure may be implemented as a program and provided to the display system.

For example, a non-transitory computer readable medium in which a program configured of steps of dividing, by the graphic manager, the image data to be displayed on the plurality of displays and transmitting the divided image data to at least one display driver and displaying, by the display driver, the received image data on the plurality of displays is stored may be provided.

The non-transitory computer readable medium is not a medium that stores data therein for a while, such as a register, a cache, a memory, or the like, but a medium that semi-permanently stores data therein and is readable by a device. Various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), and the like.

Further, although certain embodiments of the present disclosure have been disclosed for illustrative purposes, those skilled in the art will appreciate that various modifications, additions and substitutions are possible, without departing from the scope and spirit of the disclosure as disclosed in the appended claims. Accordingly, such modifications, additions and substitutions should also be understood to fall within the scope of the present disclosure as defined by the appended claims and their equivalents.

What is claimed is:

1. An electronic device, comprising:
a hardware processor for executing an application;
a first display;
a second display;
a first display driver for controlling the first display;
a second display driver for controlling the second display; and
a memory for storing a data management module, wherein when executed by the hardware processor, the data management module receives content to be displayed in association with the execution of the application, divides the content included in image layers into a first content and a second content, groups the first content and the second content into a first image layer stack and a second image layer stack, respectively, and transmits the first image layer stack to the first display driver and the second image layer stack to the second display driver, wherein the data management module is performed in a software layer different from the application and the first and second display drivers.

2. The electronic device of claim 1, wherein the first display driver is set to display the first image layer stack using the first display and the second display driver is set to display the second image layer stack using the second display.

3. The electronic device of claim 1, wherein the data management module forms at least a portion of a middleware and a framework.

4. The electronic device of claim 1, wherein the content is generated using attributes determined based on situation information associated with at least one of the electronic device, the content, and the application.

5. The electronic device of claim 4, wherein the situation information includes at least one of an activation state of the first display, an activation state of the second display, an interconnection state between the first display and the second display, and an execution state of the application.

6. An electronic device, comprising:
a plurality of displays;
a hardware processor electrically connected to the plurality of displays; and
a memory electrically connected to the hardware processor,
wherein the memory stores a middleware, which when executed by the hardware processor, divides content data included in image layers to be displayed on the plurality of displays, groups the divided content data into a plurality of an image layer stack and transmits the plurality of the image layer stack to display drivers of the plurality of displays content, wherein the middleware is performed in a software layer.

7. The electronic device of claim 6, wherein the middleware, which when executed by the hardware processor, divides the content data to be displayed on the plurality of displays based on at least one of an execution of an application, a change in a content reproducing state of the application being executed, and a change in an interconnection state of the plurality of displays.

8. The electronic device of claim 7, wherein the change in the content reproducing state of the application is at least one of a case in which different content is displayed on the plurality of displays, a case in which one content is divided and displayed, and a case in which different content and one content are separated and simultaneously displayed.

9. The electronic device of claim 8, wherein the middleware, which when executed by the hardware processor, divides the content data to be displayed on the plurality of displays, and transmits image layers to the display drivers of the plurality of displays.

10. The electronic device of claim 8, wherein the content to be displayed on the plurality of displays is at least one of a content received from outside the electronic device and content generated from the electronic device.

11. The electronic device of claim 7, wherein the change in the interconnection state of the plurality of displays is at least one of a case in which at least one display is changed in a direction different from the other displays in the state in which the plurality of displays face the same direction and a case in which a state in which at least one of the plurality of displays faces a direction different from the other displays is changed to a state in which the plurality of displays all face the same direction.

12. The electronic device of claim 11, wherein the middleware, which when executed by the hardware processor, does not transmit the content data to be displayed on the display of which the direction is changed to the display driver of the display of which the direction is changed and transmits the content data to be displayed on the display of which the direction is not changed to the display drivers of the displays, of which the directions are not changed, in response to a change that at least one display is changed in the direction different from the other displays in the state in which the plurality of displays face the same direction.

13. The electronic device of claim 12, wherein the change that at least one display is changed in the direction different from the other displays in the state in which the plurality of displays face the same direction is determined by at least one display moving beyond a preset value.

14. The electronic device of claim 12, wherein the middleware, which when executed by the hardware processor, transmits the content data to be displayed on the display of which the direction is not changed among the content simultaneously displayed on the plurality of displays to the display drivers of each of the displays of which the directions are not changed while the size of the content data displayed on the display is changed.

15. A method for controlling a display of an electronic device, comprising:
dividing, by a middleware stored in the electronic device and executed by a hardware processor, content data to be displayed on a plurality of displays;
grouping, by the middleware stored in the electronic device, and executed by the hardware processor, the divided content data into a plurality of an image layer stack;
transmitting, by the middleware stored in the electronic device and executed by the hardware processor, the plurality of the image layer stack to display drivers of the plurality of displays; and
transmitting, by the display driver, the image layer stack to at least one display and displaying a content, wherein the middleware is performed in a software layer.

16. The method of claim 15, wherein dividing the content data to be displayed on the plurality of displays, further includes at least one of a case in which an application is executed, a case in which a content reproducing state of the application is changed, and a case in which a connection state of the plurality of displays is changed.

17. The method of claim 16, wherein the change in the content reproducing state of the application is at least one of a case in which different content is displayed on the plurality of displays, a case in which one content is divided and displayed, and a case in which different content and one content are separated and simultaneously displayed.

18. The method of claim 17, wherein, the middleware, when executed by the hardware processor, further includes dividing the content data to be displayed on the plurality of displays, and transmitting image layers to the display drivers.

19. The method of claim 16, wherein the change in the connection state of the plurality of displays is at least one of a case in which at least one display is changed in a direction different from the other displays in a state in which the plurality of displays face the same direction and a case in which a state in which at least one display faces the direction different from the other displays is changed to a state in which all the displays face the same direction.

20. The method of claim 19, wherein the middleware, when executed by the hardware processor further includes not transmitting the content data to be displayed on the display of which the direction is changed and transmitting the content data to be displayed on the display of which the direction is not changed to the display driver, when at least one display is changed in the direction different from the other displays in the state in which the plurality of displays face the same direction.

21. The method of claim 20, further comprising:
transmitting the content data to be displayed on the display of which the direction is not changed among the content simultaneously displayed on the plurality of displays to the display driver of the display of which the direction is not changed while the size of the content data is changed.

22. A non-transitory recording medium in which a middleware for executing a method for controlling a display of an electronic device is stored, wherein upon execution by a hardware processor, to the method divides content data included in image layers to be displayed on a plurality of displays, groups the divided content data into a plurality of an image layer stack, transmits the plurality of the image layer stack to display drivers of the plurality of displays, and transmits the plurality of the image layer stack to the at least one display to display a content, wherein the middleware is performed in a software layer.

* * * * *